(12) United States Patent
Wadahara et al.

(10) Patent No.: US 6,384,128 B1
(45) Date of Patent: May 7, 2002

(54) THERMOPLASTIC RESIN COMPOSITION, MOLDING MATERIAL, AND MOLDED ARTICLE THEREOF

(75) Inventors: Eisuke Wadahara; Kenichi Yoshioka; Soichi Ishibashi, all of Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/619,536

(22) Filed: Jul. 19, 2000

(51) Int. Cl.⁷ .................................................. C08K 3/04
(52) U.S. Cl. ...................................................... 524/496
(58) Field of Search ........................ 524/496; 429/447.3, 429/447.5, 447.7; 428/408

(56) References Cited

U.S. PATENT DOCUMENTS

| | | | |
|---|---|---|---|
| 3,399,104 A | * 8/1968 | Ball et al. ...................... 168/68 |
| 4,395,362 A | * 7/1983 | Satoh et al. ................. 524/496 |
| 4,474,685 A | * 10/1984 | Annis ........................ 524/495 |
| 4,528,213 A | * 7/1985 | Nelson et al. ............... 524/496 |
| 4,559,164 A | * 12/1985 | Kosteinik et al. ........... 524/496 |
| 4,579,902 A | * 4/1986 | O'Brien ....................... 524/496 |
| 4,582,864 A | * 4/1986 | Abe et al. .................... 524/496 |
| 4,585,578 A | * 4/1986 | Yonahara et al. ........... 524/496 |
| 4,602,051 A | * 7/1986 | Nabeta et al. ............... 524/496 |
| 4,604,413 A | * 8/1986 | Nabeta et al. ............... 524/496 |
| 4,675,143 A | * 6/1987 | Wakita et al. ............... 252/104 |
| 4,816,289 A | * 3/1989 | Komatsu et al. ......... 423/447.3 |
| 5,141,982 A | * 8/1992 | Oku et al. ................... 524/432 |
| 5,547,609 A | * 8/1996 | Belfoure ..................... 524/496 |
| 5,750,616 A | * 5/1998 | Shimpuku et al. .......... 524/496 |
| 5,820,788 A | * 10/1998 | Smith ......................... 524/496 |

* cited by examiner

*Primary Examiner*—Veronica P. Hoke
(74) *Attorney, Agent, or Firm*—Morrison & Foerster LLP

(57) ABSTRACT

A thermoplastic resin composition capable of providing a thin walled molded article whose flame retardancy with a thickness of 1.6 mm (¹⁄₁₆ inch) in accordance with an UL 94 standard is V-0 or better, and which comprises the following components [A], [B] and [C], wherein the component [B] satisfies the following conditions (B1) and/or (B2):

[A]: an electrically conductive fiber;
[B]: a carbon powder;
[C]: a thermoplastic resin;
(B1): Raman scattering intensity ratio $I_2/I_1$ is 0.55–0.8;
(B2): Raman scattering intensity ratio $I_2/I_3$ is 0.54–0.8;
where
$I_1$: local maximum value of Raman scattering intensity appearing near a Raman shift of 1360 $cm^{-1}$;
$I_2$: local minimum value of the Raman scattering intensity appearing near a Raman shift of 1480 $cm^{-1}$;
$I_3$: local maximum value of the Raman scattering intensity appearing neat a Raman shift of 1600 $cm^{-1}$.

27 Claims, 1 Drawing Sheet

THERMOPLASTIC RESIN COMPOSITION, MOLDING MATERIAL, AND MOLDED ARTICLE THEREOF

TECHNICAL FIELD

The present invention relates to a thermoplastic resin composition having high electrical conductivity, excellent thin-wall moldability, good appearance and high flame retardancy, and to a molding material and a molded article that are made from the thermoplastic resin composition.

BACKGROUND ARTS

It has conventionally been known that a thermoplastic resin composition having a desired electrical conductivity and a molded article thereof are obtained by compounding an electrically conductive fiber (or an electrically conductive filler) with a resin.

Thermoplastic resin compositions obtained by compounding electrically conductive fibers (or electrically conductive fillers) and molded articles thereof as mentioned above typically exhibit volume resistivity above 2.5 Ω·cm, and are rarely applied to uses where a volume resistivity less than that value is preferable, for example, electromagnetic wave shield materials and the like. In cases where a volume resistivity of less than 2.5 Ω·cm is required, simple increases in the amount of an electrically conductive fiber (or a electrically conductive filler), or a combined use of an electrically conductive fiber and another electrically conductive filler and the like, have been attempted.

An attempt to raise the electrical conductivity by increasing the amount of the electrically conductive fiber (or electrically conductive filler) almost always results in unreasonable increases in the costs and the specific gravities of the thermoplastic resin composition and molded articles thereof, and gives rise to problems of, for example, considerable reductions in the impact strength and the moldability (flowability during a molding process or the like) and, moreover, impairment of the appearance of molded articles. With regard to the aforementioned problem of viscosity increase of the composition, an art of physically compounding large amounts of various carbon blacks is proposed, for example, in JP-A-7330987.

An art of using a combination of an electrically conductive fiber and an electrically conductive filter (carbon black, in blow proposals) is proposed, for example, in JP-A-9-87417 and JP-A-8-269228 (U.S. Pat. No. 5,750,616). However, none of these proposals satisfies the requirements of high electrical conductivity and thin-wall moldability altogether.

In view of the aforementioned background of the conventional arts, the invention is intended to provide a thermoplastic resin composition having high electrical conductivity, excellent thin-wall moldability, good appearance, and high flame retardancy, and a molding material and a molded article thereof.

SUMMARY OF THE INVENTION

In order to achieve the aforementioned object, the invention adopts the following means. That is, the invention relates to a thermoplastic resin composition which is capable of providing a molded article whose flame retardancy with a thickness of 1.6 mm (1/16 inch) in accordance with an UL 94 standard is V-0 or better and which comprises a component [A], a component [B] and a component [C] mentioned below, wherein the component [B] satisfies following conditions (B1) and/or (B2):

[A]: an electrically conductive fiber
[B]: a carbon powder
[C]: a thermoplastic resin
  (B1): Raman scattering intensity ratio $I_2/I_1$ is 0.55–0.8
  (B2): Raman scattering intensity ratio $I_2/I_3$ is 0.54–0.8
where
  $I_1$: local maximum value of Raman scattering intensity appearing near a Raman shift of 1360 cm$^{-1}$
  $I_2$: local minimum value of the Raman scattering intensity appearing near a Raman shift of 1480 cm$^{-1}$
  $I_3$: local maximum value of the Raman scattering intensity appearing near a Raman shift of 1600 cm$^{-1}$ The molding material and the molded article of the invention is characterized by processing or molding a thermoplastic resin composition as described above.

Figure 1:
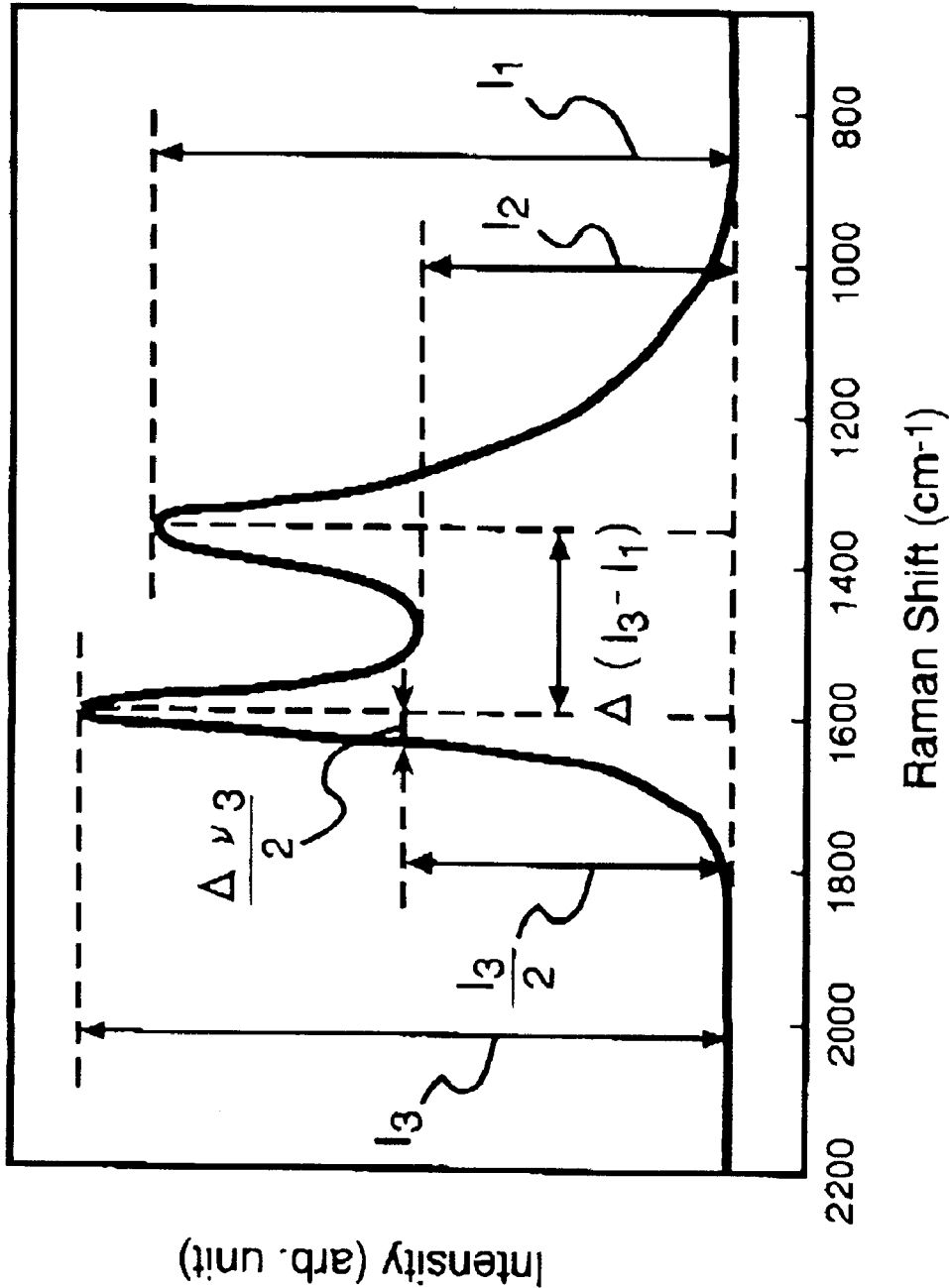
FIG. 1 indicates a Raman spectrum of an example of a carbon powder that composes the thermoplastic resin composition of the invention.

DESCRIPTION OF CHARACTERS $I_1$: local maximum value of Raman scattering intensity appearing near a Raman shift of 1360 cm$^{-1}$
$I_2$: local minimum value of the Raman scattering intensity appearing near a Raman shift of 1480 cm$^{-1}$
$I_3$: local maximum value of the Raman scattering intensity appearing near a Raman shift of 1600 cm$^{-1}$
$\Delta v_3/2$: width only on a high-frequency side of a half of $I_3$
$\Delta(I_3-I_1)$: Raman shift width between $I_3$ and $I_1$

DETAILED DESCRIPTION OF PREFERRED EMBODIMENTS

In the present inventions intensive researches have been conducted with respect to the aforementioned object, that is, to obtain a thermoplastic resin composition having high electrical conductivity, excellent thin-wall moldability, good appearance and high flame retardancy, and a thermoplastic resin composition which has been made by using a combination of an electrically conductive fiber and a carbon powder satisfying specific conditions has been found to achieve the object altogether.

Various components of the invention will be sequentially described below.

Component [A]

The component [A] needs only to be an electrically conductive fiber. For example, graphite fibers and carbon fibers (hereinafter, the two groups of fiber may be collectively referred to as carbon fibers) made from polyacrylonitrile (PAN)-type materials, pitch-type materials, rayon-type materials and the like, metallic fibers such as stainless steel fibers, copper fibers and the like, etc., may be used. Besides the carbon fibers and glass fibers of S-glass, E-glass and the like, it is also possible to use electrically conductive fibers formed by coating at least one layer of a metal, such as nickel, copper, ytterbium or the like, on an inorganic fiber, such as a boron fiber, a silicon carbide fiber, a silicon nitride fiber or the like, or an organic fiber, such as an aramid fiber, a polyester fiber, an acryl fiber, a nylon fiber, a polyphenylene sulfide fiber or the like, etc., by a plating method (electro or electroless), a vapor deposition method, such as a CVD method, a PVD method, an ion plating method or the like, and furthermore a material obtained by blending two or more of the aforementioned fibers, or a blend of an electrically conductive fiber and a reinforcing fiber that does not develop electrical conductivity, such as a glass fiber or the like.

The average filament diameter of the electrically conductive fiber is preferably 1–20 µm and, more preferably, 3–17 µm and, still more preferably, 4–12 µm. If the average filament diameter is less than 1 µm, the impregnation of electrically conductive fiber bundles (or yarns, strands, tows) with a resin becomes difficult, and there may occur a problem of a poor dispersability of electrically conductive fibers in a molded article or the like. If the average filament diameter exceeds 20 µm, mechanical properties of the electrically conductive fibers become poor and it become impossible to achieve desired electrical conductivity or desired reinforcing effect.

As a component [A], it is possible to use a component that is surface-treated with a coupling agent, such as a silane-type coupling agent, an aluminate-type coupling agent, a titanate-type coupling agent or the like, or a urethane-type resin, an epoxy-type resin, an acryl-type resin, an ester-type resin, a styrene-type resin, an olefin-type resin, an amide-type resin, a vinyl-type resin, a phenol-type resin or the like.

Preferred as the component [A] is electrically conductive fiber selected from from a group consisting of carbon fibers, graphite fibers and metal-coated fibers, in view of total balance of specific gravity, mechanical properties of molded articles, costs and the like. Preferred among the metal-coated fibers are fibers obtained by coating carbon fibers or glass fibers with metals (metals including any one of nickel, ytterbium and copper), in view of mechanical properties.

As examples of the carbon fibers and the graphite fibers, carbon fibers of a polyacrylonitrile (PAN) type, a pitch (of isotropy, mesophase and the like) type, a cellulose (viscose rayon, cellulose acetate and the like) type, a vapor deposited type, and the like can be used. Preferred among these are PAN type carbon fibers, which are excellent in the balance of price and mechanical properties such as strength, modulus and the like.

As for the carbon fiber used in the invention, it is preferable that the crystal size (hereinafter, referred to as Lc) measured by a wide-angle X-ray diffraction method be within a range of 1–5 nm. If Lc is less than 1 nm, the carbonization or graphitization of the carbon fiber is not sufficient and the electrical conductivity of the carbon fiber itself becomes low. Due to this, a resultant molded article may have a poor electrical conductivity. Therefore, Lc less than 1 nm is not preferable. If Lc exceeds 5 nm, the carbonization or graphitization of the carbon fiber is sufficient and the electrical conductivity of the carbon fiber is excellent; however, the carbon fiber becomes brittle and apt to have broken fibers. Due to this, fibers in molded articles have reduced lengths and high electrical conductivity cannot be expected. Therefore, Lc exceeding 5 nm is not preferable. It is more preferable that Lc be within a range of 1.3–4 nm. It is still more preferable that Lc be within a range of 1.6–3 nm. It is further more preferable that Lc be within a range of 1.8–2.5 nm. The measurement by a wide-angle X-ray diffraction method was conducted by a method described in Carbon 36, p.25 (1963), the 117th committee of Japan Society for the Promotion of Science.

As for the carbon fiber used in the invention, it is preferable that the ratio of the number of oxygen atoms (O) and the number of carbon atoms (C) on surfaces of carbon fibers measured by an X-ray photoelectron spectroscopy, that is, the quantity of surface functional groups (O/C), be within a range of 0.02–0.2. An (O/C) less than 0.02 means that the functional groups that exist on the carbon fiber surfaces and contribute to adhesion to a resin are very few. If the adhesiveness between carbon fibers and the resin is poor, desired mechanical properties cannot be achieved. Therefore, (O/C) less than 0.02 is not preferable. An (O/C) greater than 0.2 means that a surface treatment, such as an electrolytic treatment of carbon fiber surfaces in an acidic aqueous solution or an alkaline aqueous solution or the like, has been conducted more than necessary and carbon or graphite crystal structures have been destroyed and fragile layers have been formed on carbon fiber surfaces. In this case, contact resistance where carbon fibers contact one another becomes high and molded article cannot be expected to have high electrical conductivity. Therefore, the (O/C) greater than 0.2 is not preferable.

If the (O/C) is within the range of 0.02–0.2, good advantages, other than the adhesiveness between carbon fibers and a resin, can be achieved, for example, dispersity of carbon fibers in a molded article, etc. A more preferable range of (O/C) is 0.03–0.17. A still more preferable range thereof is 0.04–0.15. A further more preferable range thereof is 0.05–0.13.

The surface function group (O/C) was measured by an X-ray photoelectron spectroscopy in the following procedure. In this embodiment, the measurement was conducted by using ESCA-750 by made Shimazu Seisakusho (KK) and the sensitivity correction value was 2.85.

(1) First, after carbon fibers from which a sizing agent or the like has been removed are spread and placed on a sample support table made of copper, the photoelectron escape angle is set to 90° and MgKα1, 2 is used as an X-ray source, and $1.3 \times 10^{-6}$ Pa ($1 \times 10^{-8}$ Torr) was maintained in a sample chamber.

(2) As a correction of a peak in association with electrification during measurement, the kinetic energy value B.E. at a main peak of $C_{1S}$ is adjusted to 284.6 eV. The $C_{1S}$ peak area is determined by drawing a straight baseline within a range of 282–296 eV. The $O_{1S}$ peak area is determined by drawing a straight baseline within a range of 528–540 eV.

(3) The surface functional area quantity (O/C) is calculated as an atom number ratio from the ratio of the $O_{1S}$ peak area and the $C_{1S}$ peak area by using a sensitivity correction value specific to the apparatus.

The carbon fibers may be fibers subjected to an electrolytic treatment in an acidic aqueous solution or an alkaline aqueous solution as long as the surface function group (O/C) of the carbon fibers is within the range of 0.02–0.2. However, it is preferable that the carbon fibers have been subjected to an electrolytic treatment in an acidic aqueous solution where the (O/C) can be more easily controlled within a preferable range.

The carbon fibers used in the invention preferably has a strand tensile breaking elongation of at least 1%. If the strand tensile breaking elongation is less than 1%, carbon fibers are apt to break during a molding process or a production process (particularly, a resin impregnation process) of a molding material made by using a thermoplastic resin composition according to the invention. Therefore, since the carbon fiber length in a molding material and a molded article thereof cannot be increased, high electrical conductivity cannot be achieved and the mechanical property becomes poor, and high productivity of the molding material cannot be achieved. To solve the problems, it is advisable to use carbon fibers wherein the strand tensile breaking elongation is at least 1% and, more preferably, the strand tensile breaking elongation is at least 1.5% and, further more preferable, the strand tensile breaking elongation is at least 1.9%. The carbon fibers used in the invention preferably has the strand tensile breaking elongation of less than 5%.

The average filament diameter of the carbon fibers is preferably 1–15 μm and, more preferably, 3–13 μm and, still more preferably, 4–10 μm. If the average filament diameter is less than 1 μm, the impregnation of carbon fiber bundles (or yarns, strands, tows ) with a resin becomes difficult and there may occur a problem of a poor dispersability of carbon fibers in a molded article or the like. If the average filament diameter exceeds 15 μm, mechanical properties of the carbon fibers become poor and it become impossible to achieve desired electrical conductivity effect or desired reinforcing effect.

As a spinning method of the PAN-type carbon fibers, wet spinning, semi-wet spinning (Airgap-wet spinning) and the like may be cited. In accordance with desired properties, an arbitrary spinning method can be selected. If a PAN-type carbon fiber is used in a combination with a component [C] that has a relatively low adhesiveness (e.g., a polycarbonate resin, a styrene resin, a polyphenylene ether resin, etc.), the PAN-type carbon fiber is preferably a fiber produced by wet spinning, in which an anchor effect by a fibril configuration on fiber surfaces can b expected. If a PAN-type carbon fiber is used in a combination with a component [C] that has a relatively high adhesiveness (e.g., a polyamide resin, a polyester resin, etc.), the PAN-type carbon fiber is preferably a fiber produced by semi-wet spinning, in which development of higher mechanical properties (tensile strength, impact strength, etc.) can be expected.

The vapor deposited carbon fiber (Vaper-Grown Carbon Fiber, VGCF) refers to a carbon fiber or a graphite fiber provided by a production method in which crystals are grown in a vapor phase and may have an arbitrary form, such as a needle form, a coil form, etc. Cited as an example of the production method may be a method in which a carbon compound, such as benzene, methane, carbon monoxide, etc., and an organic transition element metal compound of an iron type or a nickel type, such as ferrocene, metallocene or the like, that is, a catalyst, are fired at a high temperature (normally, 800–1300° C.) in a carrier gas, such as hydrogen or the like, as disclosed in, for example, JP-A-5-221622, etc. As for the vapor deposited carbon fibers, it is preferable that the aspect ratio be within a range of 5–1000 and the average filament diameter be within a range of 0.01–1 μm and, more preferably, 0.1–0.5 μm, because such ranges achieve a high electrical conductivity applying effect.

Component [B]

As a carbon powder of a component [B], a carbon powder must satisfy the following conditions (B1) and/or (B2).

(B1): Raman scattering intensity ratio $I_2/I_1$ is 0.55–0.8

(B2): Raman scattering intensity ratio $_2/I_3$ is 0.54–0.8

$I_1$: local maximum value of Raman scattering intensity appearing near a Raman shift of 1360 cm$^{-1}$ $I_2$: local minimum value of the Raman scattering intensity appearing near a Raman shift of 1480 cm$^{-1}$ $I_3$: local maximum value of the Raman scattering intensity appearing near a Raman shift of 1600 cm$^{-1}$ The values $I_1$, $I_2$, $I_3$ are values of the Raman scattering intensity after baseline correction. The baseline correction refers to an operation of approximating the baseline of the Raman spectrum to a straight line within a Raman shift range of 600–2200 cm$^{-1}$, and determining the distance from the approximate straight line as a Raman scattering intensity, and correcting the gradient of the baseline at the time of measurement.

If a carbon powder having a specific Raman spectrum as mentioned above is used, it is possible to obtain a thermoplastic resin composition having characteristically high mechanical properties, a characteristically high electrical conductivity, a characteristically excellent thin-wall moldability (in particular, flowability during a molding process) and a characteristically good appearance.

In general, the basic characteristics of a carbon powder, such as dispersity and the like, greatly change depending on production conditions. The production conditions greatly affect the crystal structure of the carbon powder. Estimation regarding the state of development of a crystal structure (graphite structure herein) of a carbon powder, that is a carbon material, is allowed by measurement of a Raman spectrum. That is, it can be said that the basic characteristics of a carbon powder can be easily grasped merely by measuring a Raman spectrum.

That is, the carbon powder in the invention is characterized in that a carbon powder wherein the Raman scattering intensity ration $I_2/I_1$ between the local maximum value $I_1$ in the Raman band and the local maximum value $I_2$ in the Raman band of the Raman spectrum is within a specific range of 0.55–0.8 is selected and used.

In the invention, it has been discovered that if a carbon powder having the aforementioned specific feature is used, a thermoplastic resin composition having a characteristically high electrical conductivity and a characteristically excellent thin-wall moldability (in particular, flowability during a molding process) can be provided. That is, in the invention, it has been found that only carbon powders having a specific Raman spectrum achieve an excellent advantage of satisfying both the high electrical conductivity requirement and the excellent thin-wall moldability requirement. The selection-type on the Raman spectrum allows easy and accurate selection without a need to individually measure various properties of a carbon powder. Therefore, the invention is every significant from an industrial viewpoint.

With regard to the above-described carbon powder, although the condition (B1.), that is, one requirement for selecting a carbon powder, is that $I_2/I_2$ is 0.55–0.8, it is advisable to use a carbon powder wherein $I_2/I_1$ is, preferably, within a range of 0.65–0.75 and, more preferably, within a range of 0.67–0.73. Particularly, a carbon powder wherein $I_2/I_1$ is within a range is 0.68–0.72 is preferred. That is, if a carbon powder wherein $I_2/I_1$ is outside the range of 0.55–0.8 is used, the flowability during a molding process becomes remarkably poor although a high electrical conductivity is achieved. Therefore, a thermoplastic resin composition having high electrical conductivity and excellent thin-wall moldability cannot be obtained. That is, in the case of a carbon powder wherein $I_2/I_1$ is less than 0.55, the flowability during a molding process become considerably poor while the electrical conductivity is not so degraded. This will be explained in terms of a melt flow rate of a pellet obtained by kneading 30 parts by weight of a carbon powder (carbon black herein) with 70 parts by weight of a nylon 6 resin. In the case of a carbon powder where the $I_2/I_1$ is within the range of 0.55–0.8, a high flowability is exhibited. However, in the case of a carbon powder wherein $I^2/I_1$ is outside the range, for example, less than 0.55, the flowability exhibited is only about ½0 or less of the flowability exhibited in the case of the carbon powder wherein $I_2/I_1$ is within the range and therefore the moldability becomes remarkably lower.

It is advisable to select a carbon powder wherein $I_2/I_3$ is within the range of 0.54–0.8 as in the condition (B2), which provides another manner of selecting a carbon powder in the invention, and, preferably, 0.57–0.67 and, more preferably, 0.59–0.65, is selected and used. In particular, a carbon powder wherein $I_2/I_3$ is within a range of 0.60–0.64 is preffered.

The effective difference between the carbon powder wherein $I_2/I_3$ is within the range of 0.54–0.8 and the carbon powder wherein $I_2/I_3$ is outside the range is substantially the same as in the case related to the above-described selecting manner. That is, the carbon powder wherein $I_2/I_3$ is outside the range is remarkably inferior in the flowability during a molding process although it achieves a high electrical conductivity. Therefore, the carbon powder does not provide a thermoplastic resin composition that satisfies both the high electrical conductivity requirement and the excellent thin-wall moldability requirement. A carbon powder selected on the aforementioned condition reliably provides a thermoplastic resin composition that achieves a further high electrical conductivity and a further excellent moldability. If a carbon powder selected in this selecting manner is used, the following advantage is achieved. That is, it is possible to achieve substantially the same flowability increase as achieved by the carbon powder selected in the above-described manner and to reliably provide a thermoplastic resin composition that achieves the objects of the invention. This will be explained in conjunction with an example where a melt flow rate of a pellet obtained by kneading 30 parts by weight of a carbon powder (herein, carbon black) with 70 parts by weight of a nylon 6 resin is measured. As for the flowability, the carbon powder with $I_2/I_3$ being outside the range exhibits a very low flowability, that is, about 1/50 or less of the flowability exhibited by the carbon powder with $I_2/I_3$ being within the range. In this respect, it is possible to select a carbon powder that exhibits a further severe flowability property.

The measurement of melt flow rates in the invention was conducted by using a melt indexer (C-5095D2-1) made by Toyo Seiki Seisakusho (KK), with a load of 1 kg after maintenance of 260° C. for 6 min, according to JIS K 7210.

As for the component [B], a carbon powder that further satisfies following conditions (B3) and/or (B4) is more preferable.

(B3): $\Delta v_3/2$ is in a range of 46–59 cm$^{-1}$
(B4): $\Delta(I_3-I_1)$ is 210–240 cm$^{-1}$
  $\Delta v_3/2$: width only on a high-frequency side of a half of $I_3$
  $\Delta(I_3-I_1)$: Raman shift width between $I_3$ and $I_1$ As for the above-described carbon powder, one selecting requirement is that $\Delta v_3/2$ is within the range of 46–59 cm$^{-1}$, it is advisable to use a carbon powder wherein $\Delta v_3/2$ is, preferably, within a range of 48–57 cm$^{-1}$ and, more preferably, within a range of 50–55 cm$^{-1}$. A particularly preferably range is 51–54 cm$^{-1}$. That is, if a carbon powder wherein $\Delta v_3/2$ is outside the range of 46–59 cm$^{-1}$ is used, the thin-wall moldability (flowability during a molding process) and the appearance become remarkably degraded although the high electrical conductivity requirement is satisfied to some extent. Therefore, it is impossible to provide a thermoplastic resin composition that serves the electrical conductivity requirement, the thin-wall moldability (flowability during a molding process) requirement and the appearance requirement. In particular, in the case of a carbon powder wherein $\Delta v_3/2$ is less than 46 cm$^{-1}$, the flowability during a molding process becomes remarkably degraded although the electrical conductivity is not so degraded.

With regard to still another manner of selecting a carbon powder in the invention, $\Delta(I_3-I_1)$ is within the range of 210–240 cm$^{-1}$. It is advisable to select and use a carbon powder wherein $\Delta(I_3-I_1)$ is, preferably, within a range of 215–235 cm$^{-1}$ and, more preferably, 217–231 cm$^{-1}$. A particularly preferred range is 220–229 cm$^{-1}$.

The effective difference between the aforementioned carbon powder, that is, the carbon powder wherein $\Delta(I_3-I_1)$ is within the range of 210–240 cm$^{-1}$, and the carbon powder wherein $\Delta(I_3-I_1)$ is outside the range is substantially the same as in the case related to the above-described selecting manner. That is, the carbon powder wherein $\Delta(I_3-I_1)$ is outside the range is remarkably inferior in the flowability during a molding process although it achieves high electrical conductivity to some extent. Therefore, the carbon powder does not provide a thermoplastic resin composition that satisfies both the electrical conductivity requirement and the thin-wall moldability requirement. As for the flowability, the carbon powder with $\Delta(I_3-I_1)$ being outside the range exhibits a very low flowability in comparison with the carbon powder with $\Delta(I_3-I_1)$ being within the range. In this respect, it is possible to select a carbon powder that exhibits a further severe flowability property.

Cited as a further more preferable carbon powder of the component [B] in the invention may be a carbon powder that satisfies all the conditions (B1), (B2), (B3) and (B4). Such a specific carbon powder satisfying all the conditions is able to reliably provide a thermoplastic resin composition that has a further high electrical conductivity and a further excellent thin-wall moldability. If a carbon powder selected in this selecting manner is used, the following advantage is achieved. That is, it is possible to achieve substantially the same flowability increase as achieved by the carbon powder selected in the above-described manner, and to reliably provide a thermoplastic resin composition that achieves the objects of the invention.

The measurement of a Raman spectrum is performed by a laser Raman spectroscopy. A Raman spectrum may be measured with respect to a carbon powder that is yet to be compounded with a resin or may be measured with respect to a thermoplastic resin composition or a molded article from which the carbon powder has been separated. It is preferred that the measurement with respect to the former specimen be performed by macro-Raman (the laser spot diameter being about 100 $\mu$m) and that the measurement with respect to the latter specimen be performed by microscopic Raman (the laser spot diameter being about 5 $\mu$m). In this invention, the measurement was performed by using a Ramaonor T-64000 made by Jobin Yvon.

It is advisable to perform separation of carbon powder from a molded resin article-type on specific gravity differences among compounded components. An example of specific means related to the technique for separating carbon powder will be described below.

First, a molded resin article is immersed in a solvent that dissolves the resin without attacking the carbon powder and the resin is completely dissolved. After that, centrifugation is performed at 5000 rpm for 30 minutes. After the centrifugation, a supernatant is supercentrifuged at 30000 rpm for 30 minutes. After the supercentrifugation, a supernatant is filtrated through a PTFE filter (0.2 $\mu$m or less) to separate carbon powder. The Raman spectrum measurement in this case is preferably performed by microscopic Raman with respect to a black fine particle fraction in a mass recovered by the above-described separation. The Raman spectrum of the carbon powder separated as described above refers to a Raman spectrum obtained after subtraction of a Raman spectrum of the PTFE filter and the like.

The kind of the component [B] in the invention is not particularly limited, as long as it is a carbon powder wherein the aforementioned Raman scattering intensity ratio is within the aforementioned range. Cited as examples of the component [B] may be carbon black, amorphous carbon powders, natural graphite powders, artificial graphite powders, expanded graphite powders, pitch micro-beads and the like. Preferred among theses is a carbon black that is low-cost and highly effective. As the carbon black, it is possible to use, for example, furnace-black (produced by burning a material oil in a high-temperature furnace), acetylene-black (produced by exothermal decomposition of acetylene gas), thermal-black, channel-black, lamp-black or the like. Furthermore, a carbon black obtained by blending two or more of the aforementioned carbon blacks may also be used.

Component [C]

The component [C] is preferably a thermoplastic resin that is excellent in impact strength and capable of being formed by injection molding or press molding, which achieve high productivity. The thermoplastic resin may be, for example, polyesters, such as polyethylene terephthalate (PET), polybutylene terephthalate(PBT), polyethylene naphthalate(PEN), liquid crystal polyester(LCP) and the like, polyolefins, such as polyethylene(PE), polypropylene (PP), polybutylene or the like, styrene-type resins, etc. or polyoxymethylene(POM), polyamide(PA), polycarbonate (PC), polymethylene methacrylate(PMMA), polyvinyl chloride(PVC), polyphenylene sulfide(PPS), polyphenylene ether(PPE), polyimide(PI), polyamide imide(PAI), polyetherimide(PEI), polysulfone(PSU), polyether sulphone (PES), polyketone(PK), polyether ketone(PEK), polyether ether ketone(PEEK), polyalylate(PAR), polyethernitrile (PEN), phenol resins (novolac type or the like), phenoxy resins, fluorocarbon resins, or, furthermore, thermoplastic elastomers of a polystyrene type, a polyolefin type, a polyurethane type, a polyester type, a polyamide type, a polybutadiene type, polyisoprene type, a fluorine type or the like, or copolymers or modifications of any of the these substances, or blended resins of two or more of the substances or the like. Furthermore, in order to improve the impact strength, resins obtained by adding an elastomer or a rubber component into any of the resins may also be used. More preferably, the component [C] is selected from the group consisting of styrene-type resins, polycarbonate resins, polyphenylene ether resins, polyamide resins, polyester resins, polyphenylene sulfide resins, polyolebi lesin, liquid-crystalline resins and phenol-type resins.

As for the thermoplastic resin of the invention, it is often the case that an amorphous thermoplastic resin (hereinafter, referred to as amorphous resin) allows maximum enjoyment of the advantages of the invention, in comparison with a crystalline thermoplastic resin (hereinafter, referred to as crystalline resin). In general, the amorphous resin is superior to the crystalline resin in dimensional stability. However, due to high melt viscosity, the moldability of the amorphous resin normally becomes remarkably degraded if the amorphous resin is simply compounded with an amount of the component [A] that is needed to achieve a high electrical conductivity. However, if an amorphous resin is used as a thermoplastic resin in the thermoplastic resin composition of the invention, the amount of the component [A] compounded can be reduced through a combined use of the component [A] and the component [B], so that a considerable improvement can be achieved in the aforementioned moldability problem and, moreover, the cost can be reduced. Therefore, the advantages of the invention can be fully realized.

With regard to the amorphous resin, it is preferably resin selected from the group consisting of a styrene-type resin, a polycarbonate resin and a polyphenylene ether resin be compounded.

The styrene-type resin contains a unit produced from styrene and/or a derivative thereof (which may be collectively termed aromatic vinyl-type monomers).

Cited as the styrene-type resin may be styrene-type (co) polymers and rubber-reinforced styrene-type (co)polymers. Cited as the styrene-type (co)polymers may be polymers obtained by polymerizing one or more monomer(s) of aromatic vinyl-type monomers and copolymers obtained by copolymerizing one or more monomer(s) of aromatic vinyl-type monomers and one or more monomer(s) of monomers that are copolymerizable with the aromatic vinyl-type monomers. Cited as the rubber-reinforced styrene (co)polymers may be copolymers having a structure wherein a (co) polymer containing styrene monomers is grafted to a gummous (co)polymer and copolymers having a structure wherein a (co)polymer containing styrene monomers is non-grafted to a gummous (co)polymer.

Cited as the (co)polymers having a graft structure may be rubber-reinforced graft polymers obtained through graft polymerization of one or more monomer(s) of aromatic vinyl-type monomers with a gummous polymer and graft copolymers obtained through graft copolymerization of one or more monomer(s) of aromatic vinyl-type monomers and one or more monomer(s) that is (are) copolymerizable with the aromatic vinyl-type monomers, with a gummous polymer, As examples of the aromatic vinyl-type monomer, it is possible to cite styrene, α-methyl styrene, p-methyl styrene, t-butyl styrene, p-t-butyl styrene, vinyl toluene, o-ethyl styrene and the like. Styrene is particularly preferable.

As representative examples of the monomer capable or copolymerizing with the aromatic vinyl-type monomer, it is possible to cite (meth)acrylic ester-type monomers, vinyl cyanide-type monomers, etc. The (meth)acrylic ester-type monomers may be esterified compounds of acrylic acic or methacrylic acid with methyl, ethyl, propyl, N-butyl or i-butyl and the like. Methyl methacrylate is preferably used. The vinyl cyanide compounds may be acrylonitrile, methacrylonitrile, ethacrylonitrile and the like. Acrylonitrile is preferably used. If necessary, it is also possible to use other vinyl-type monomers, for example, maleimide-type monomers such as maleimide, n-methylmaleimide, N-phenylmaleirnide and the like.

As the rubberlike copolymer, a rubber-like copolymer whose glass transition temperature is at most 0° C. is preferable. As the rubber-like copolymer, it is possible to cite dien-type rubbers such as butadiene rubber, styrene-butadiene copolymer rubber (SBR), acrylonitrile-butadiene copolymer rubber (NBR) and the like, acryl-type rubbers, such as polybutyl acrylate and the like, and polyolefin-type rubbers, such as ethylene-proplylene-non-conjugated diene terpolymer rubber (EPDM) and the like. Among these, polybutadiene and ethylene-proplylene-non-conjugated diene terpolymer rubber (EPDM) are preferably used.

Cited as preferable styrene-type resins in the invention may be styrene-type polymers, such as PS (polystyrene) and the like, rubber-reinforced styrene-type polymers, such as HIPS (high impact polystyrene) and the like, styrene-type copolymers, such as AS (acrylonitrile/styrene copolymer) and the like, rubber-reinforced (co)polymers, such as AES (acrylonitrile/ethylene-propylene-non-conjugated diene rubber/styrene coplymer), ABS (acrylonitrile/butadiene/ styrene copolymer), MBS (methyl methacrylate/butadiene/ styrene copolymer), ASA (acrylonitrile/styrene/acrylic rubber copolymer) and the like, etc. Among these, styrene-type polymers, such as PS (polystyrene) and the like, styrene-type copolymers, such as AS (acrylonitrile/styrene copolymer) and the like, ABS (acrylonitrile/butadiene/ styiene copolymer) and ASA (acrylonitrile/styrene/acrylic rubber copolymer) are preferable.

The property of the vinyl-type (co)polymer is not particularly limited. However, vinyl-type (co)polymers wherein the limiting viscosity [η] (measured in a methyl ethyl ketone (MEK) solvent at 30° C.) is 0.4–0.65 dl/g and, particularly, 0.45–0.55 dl/g and, if measured in an N,N-dimethylformamide solvent at 30° C., within a range of 0.35–0.85 dl/g and, particularly, 0.45–0.7 dl/g, provide resin compositions having excellent impact resistance and excellent molding proccessability, and therefore are preferable.

The production method for the vinyl-type (co)polymer is not particularly limited. It is possible to employ ordinary methods, such as a bulk polymerization, a suspension polymerization method, an emulsion polymerization method, a bulk-suspension polymerization method, a solution-bulk polymerization method and the like.

Cited as a polycarbonate (PC) resin as mentioned above may be aromatic homo or co-polycarbonate resins provided by reacting an aromatic dihydric phenol-type compound and a carbonic acid diester and having a viscosity average molecular weight within a range of 10,000–1,000,000.

Cited as specific examples of the dihydric phenol-type compound may be 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, 1-phenyl-1,1-bis(4-hydroxyphenyl)ethane, and the like. These compounds may be used singly or as a mixture thereof.

Preferably used as a polyphenylene ether (PPE)-type resin as mentioned above are polymers wherein the specific viscosity measured in chloroform at 30° C. is 0.01–0.81 dl/g. Cited as specific examples thereof may be poly(2,6-dimethyl-1,4-phenylen) ether, 2-dimethylphenol-2,4,5-trimethylphenol copolymers, 2,6-dimethylphenol-2,3,5-triethylphenol copolymers, etc.

It is also possible to use a combination of two or more of the amorphous resins. Specifically, a combination of an ABS resin, an ASA resin or an AS resin and a PC resin, a combination of a PPE resin and a PS resin and/or an HIPS resin, a combination of a PC resin and a PS resin and/or an HIPS resin, and the like may be cited as preferable examples.

In order to provide other properties, for example, chemical resistance, flowability during a molding process and the like, it is possible to replace a portion of one of the amorphous resins or a mixture of two or more of the amorphous resins (normally, less than 70 wt. % of the resin component and, preferably, less than 60 wt. % thereof and, particularly preferably, less than 50 wt. % thereof) with a crystalline resin. Cited as such crystalline resins may be, for example, polyamide resins, such as nylon 6, nylon 66, aromatic-containing polyamide or the like, polyester resins, such as polyethylene terephthalate(PET), polybutylene terephthalate(PBT) or the like, polyphenylene sulfide resins (PPS), polyolefin resins, such as polyethylene(PE), polypropylene(PP), polybutylene or the like, liquid-crystal resins (LCP), and the like. Preferably cited as examples of the crystalline resins may be a combination of a PC resin or a combination of a PC resin and an ABS resin or a combination of a PC resin and an ASA resin and PBT resin and/or PET resin, a combination of an ABS resin and nylon 6 and/or nylon 66 and/or an aromatic-containing polyamide resin, a combination of a PC resin and nylon 6 and/or nylon 66, a combination of a PC resin or a combination of a PC resin and an ABS resin or a combination of a PC resin and an ASA resin, and a LCP resin, a combination of a PPE resin and nylon 6 and/or nylon 66 and/or an aromatic-containing polyamide resin, a combination of a combination of a PPE resin and a PS resin and/or an HIPS resin, and a LCP resin, etc.

Use of a crystalline resin also achieves a further improvement of the dispersability of the components [A] and [B] in a molded article and a further improvement in the productivity of a molding material made of a thermoplastic resin composition. As for the crystalline resin, it is preferable that at least one resin selected from the group consisting of polyamide resins, polyesters resins, polyphenylene sulfide resins, polyolefin resins and liquid-crystal resins be compounded. A combined use of two or more resins of these crystalline resins is also possible. Specifically, a combination of a polyamide resin and a liquid-crystal resin, a combination of a polyester resin and a liquid-crystal resin, a combination of a polypropylene resin and a liquid-crystal resin, and the like may be preferably cited as examples.

The aforementioned polyolefin resins are polymers containing as a main component unit an α-olefin that normally has a carbon number of about 2–10, such as ethylene, propylene, butene-1, pentene-1, hexene-1, octene-1, and the like. The polyolefin resins also include homopolymers or copolymers of these a-olefins, and copolymers of these polymers and vinyl acetate, acrylic acid ester, unsaturated carboxylic acid (anhydride), unsaturated silane compounds or the like. Cited as preferable polyolefin resins may be polyethylene (PE), polypropylene (PP), polybutylene, ethylene/propylene copolymer (PE/PP), and the like. These resins may be used singly or as a mixture thereof.

The aforementioned liquid-crystal resins are resins that can form anisotropy when melted. Cited as the liquid-crystal resins may be liquid-crystal polyesters, liquid-crystal polyester amides, liquid-crystal polycarbonates, liquid-crystal polyester elastomers, and the like. Among theses, liquid-crystal polyesters, liquid-crystal polyester amides and the like are preferably used. As particularly preferable liquid-crystal resins, liquid-crystal polyesters may be cited.

As a crystalline thermoplastic resin in the invention, a polyamide resin or a polyester resin is particularly preferably used in view of the interface adhesiveness to the component [A].

In the invention, a particularly useful polyamide resin is a nylon resin that has a melting point of at least 150° C. and has excellent heat resistance and excellent strength. As specific examples, nylon 6, nylon 66, nylon 46, nylon 610, nylon 612, nylon 9T, nylon 66/6T, nylon 6T/6, nylon 6I/6, nylon 66/6T, nylon 66/6I, nylon 12/6T, nylon 66/6T/6I, nylon 6T/6I, nylon 6T/M5T, nylon 66/6/6I, nylon XD6 (such as MXD6, and the like), and mixtures and copolymers of these nylons, etc. may be preferably used.

In accordance with the need for improvement of a property (particularly, impact strength), it is also possible to use a resin that is provided with a desired property by adding at least one polymers selected from the group consisting of olefin-type polymers modified by an acid, such as maleic acid anhydride or the like, olefin-type copolymers such as ethylenelpropylene copolymers, ethylenell-butene copolymers, ethylene/propylenel non-conjugated copolymers, ethylene/ethyl acrylate copolymers, ethylene/ glycidyl methacrylate copolymers, ethylene/vinyl acetate/ glycidyl methacrylate copolymers, ethylene/propylene-g-maleic acid anhydride copolymers, ABS, and the like, and elastomers such as polyester polyether elastomers, polyester polyester elastomers, and the like.

The polymerization degree of the polyamide resins is not particularly limited. However, in order to provide a thin-wall molded article, polyamide resins having good flowability during a molding process are advantageous. Polyamide resins wherein the sulfuric acid-relative viscosity ηr is 1.5–2.7 are preferable. If ηr exceeds 2.7, the flowability during a molding process becomes degraded, and the flowability during a molding process is not effectively developed. In particular, if a thin-wall molded article is formed, there is possibility that flow marks or float-out of the components [A] and [B] will occur on surfaces of the molded article and, therefore, surface smoothness will deteriorate, and that strong weld lines will occur and appearance of the molded article will considerably deteriorate. If ηr is less than 1.5, the flowability is excellent, but mechanical properties (particularly, impact strength, elongation, etc.) become degraded. Moreover, due to increased low-molecular weight components, a large amount of gas is produced during a molding process, so that the moldability may be degraded. Thus, such a low ηr is not preferable. More preferable are polyamide resins wherein ηr is 1.8–2.6. Still more preferable are polyamide resins wherein ηr is 2–2.5. Polyamide resins wherein ηr is 2.1–2.4 are particularly preferable. The sulfuric acid-relative viscosity ηr is provided as follows. A specimen is dissolved in 98% sulfuric acid to a solution concentration of 1 g/100 ml, and then a flow-down rate is measured in an incubator at 25° C. by an Ostwald viscometer. The sulfuric acid-relative viscosity ηr is expressed by a viscosity ratio (ratio of numbers of flow-down seconds) of the specimen solution to 98% sulfuric acid.

Cited as the polyester resins may be, substantially, condensation polymers of dicarboxylic acid and glycol, ring-opening polymers of cyclic lactone, condensation polymers of hydroxy-carboxylic acid, condensation polymers of dibasic acid and glycol, and the like. More specifically cited as the polyester resins may be polyethylene terephthalate resins, polypropylene terephthalate resins, polybutylene terephthalate resins, polyethylene naphthalate resins, polybutylene naphthalate resins, polycyclohexanedimethylene terephthalate resins, polyethylene-1,2-bisphenoxy)ethane-4, 4'-dicarboxylate resins, and furthermore, polyethylene-1,2-bis(phenoxy)ethane4,4'-dicarboxylate resins, and furthermore, copolymers or mixtures such as polyethylene isophthlate/terephthalate resins, polyethylene terephthalate/isophthalate resins, polybutylene terephthalate/decanedicarboxylate resins, polycyclohexanedimethylene terephthlate/isophthalate resins, etc.

Cited as preferable polyester resins in the invention may be polyethylene terephthalate resins, polypropylene terephthalate resins, polybutylene terephthalate resins, and polyethylene naphthalate resins. More preferable polyester resins in the invention are polyethylene terephthalate (PET) resins and polybutylene terephthalate (PBT) resins.

The molecular weight of the aforementioned polyester resins is not particularly limited. Normally, polyester resins wherein the intrinsic viscosity measured at 25 degrees by using a mixed solution of phenol/tetrachloroethane of 1:1 is 0.1–3.0 may be used. The intrinsic viscosity of the polyester resins is preferably 0.25–2.50 and, more preferably, 0.40–2.25.

If a molded article is to be provided with high flame retardancy, it is preferred that a phenol-type resin be compounded in the aforementioned thermoplastic resin or the like.

The aforementioned phenol-type resin refers to phenol-type resins obtained through homopolymerization or copolymerization of a component having at least a phenolic hydroxyl group. Cited as examples thereof may be various phenol reins (phenolic novolac, creosol novolac, octyl phenol, phenylphenol, naphthol novolac, phenol aralkyl, naphtol aralkyl, phenol resol, etc.), modified phenol resins (alkylbenzene-modified (articularly, xylene-modified), cashew-modified, terpen-modified, and the like), and the like. As preferable phenol-type polymers, phenol novolac resins, phenol aralkyl resins and the like may be cited.

Cited as particularly excellent phenol resins used in the invention may be phenol novolac, terpen-modified phenol, and xylene-modified phenol (particularly, mataxylene-modified phenol). In particular, if such an excellent phenol resin is compounded in a resin, excellent moldability and excellent flame retardancy can be developed due to the high affinity of the phenol resin.

It is preferable that these phenol-type resins have a weight average molecular weight within a range of 200–20000. If the molecular weight is less than 200, the thermal stability becomes degraded, so that the resin evaporates during a molding process and, therefore, the molded article has defects, such as voids or the like. If the molecular weight exceeds 20000, the thin-wall moldability (flowability during a molding process) becomes degraded, so that the advantages of the invention cannot be fully achieved. Thus, such a high molecular weight is not preferable. The molecular weight is more preferably within a range of 300–10000 and, still more preferably, within a range of 400–5000. The weight average molecular weigh was measured by using a gel permeation chromatography (GPC) and using, as a detector, a low-angle light-scattering photometer (LALLS) employing a laser.

Component [D]

The thermoplastic resin composition of the invention may contain a flame retardant as a component [D]. The component [D] is selected from the group consisting of halogen compounds, antimony compounds and/or the group consisting of non-halogen compounds, such as phosphorus compounds, nitrogen compounds, silicone compounds, fluorine compounds and metal hydroxides.

The halogen compounds used in the invention are not particularly limited as long as the compounds are organic or inorganic compounds having halogen elements (chloride and bromine). Cited as representative examples of the halogen compounds may be bromine-type compounds, such as tetrabromobisphenol A, decabromodiphenyl oxide, hexabromocyclododecane, octabromnodiphenyl oxide, bis-tribromophenoxy ethane, tribromophenol, ethylene-bis-tetrabromophthalimide, tetrabromo-bis-phenol A polycarbonate oligomers/polymers, brominated polystyrene, tetrabromo-bis-phenol A epoxy oligomers/polymers, decabromodihenyl ethane, polydibromophenyl oxide, brominated polyphenylene oxide, hexabromobenzene, tetradecabromodiphenoxy oxybenzene, brominated epoxy oligomers, bis(tetrabromophthalimide) ethane, bis-(tribromophenoxy) ethane, tetrabromo phthalic acid anhydride, tetrabromo-p-creosol, and the like, and chlorine-type compounds, such as chlorinated paraffin, perchlorocyclopentadecane, and the like.

Cited as examples of the antimony compound used in the invention is not particularly limited as long as it is an organic or inorganic compound containing antimony. Antimony trioxide, antimony pentoxide and the like may be cited as examples. Among these, antimony trioxide is particularly preferred.

The phosphorus compound used in the invention is not particularly limited as long as it is an organic or inorganic compound containing phosphorus. For example, ammonium polyphosphate, polyphosphazene, phosphate, phosphonate, phosphinate, phosphine oxide, red phosphorus and the like may be cited. These phosphorus compounds may be used singly or in a combination. Among these, ammonium polyphosphate, aromatic phosphate and red phosphorus are preferable. Red phosphorus is particularly preferred since red phosphorus has a high content of phosphorus atoms among the phosphorus compounds and therefore achieves, even in a small amount added, a high flame retardancy.

The aforementioned ammonium polyphosphate is a compound expressed by a general formula $(NH_4)_{n+2}P_nO_{3n+1}$ (where n is an integer of 20–1000). Furthermore, since ammonium polyphosphate alone is subject to hydrolysis, ammonium polyphosphate coated or provided in a microcapsule by using a thermoplastic resin, or ammonium polyphosphate particles coated with melamine monomers or other nitrogen-containing organic compounds or the like may be preferably used.

As preferable commercially available products of ammonium polyphosphate, "Exolit 422" and "Exolit 462" by Hoechst AG, and "Terraju C60" by Chisso co., and their equivalents may be cited.

The aromatic phosphate can be expressed by the following chemical formula 1: First, the structure of the aromatic phosphate expressed by chemical

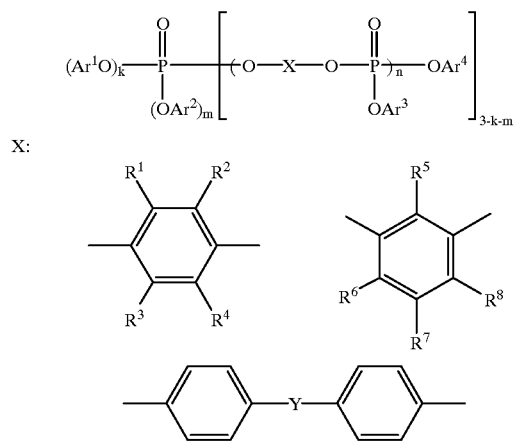

formula 1 will be described. In chemical formula 1, n is an integer equal to or greater than 0. Furthermore, k, m are integers equal to or greater than 0 and less than or equal to 2, and k+m is an integer equal to or greater than 0 and less than or equal to 2. Preferably, k, m are integers equal to or greater than 0 and less than or equal to 1. More preferably, k, m are both 1.

Furthermore, in the equation of chemical formula 1, $R^1$–$R^5$ represent the same or different alkyl groups having a hydrogen or carbon number of 1–5. Cited as specific examples of the alkyl groups having a carbon number of 1–5 may be a methyl group, an ethyl group, an a-propyl group, an isopropyl group, n-butyl group, sec-butyl group, tert-butyl group, neopentyl group, and the like. Hydrogen, a methyl group and an ethyl group are preferable. Hydrogen is particularly preferred.

Furthermore, $Ar^1$, $Ar^2$, $Ar^3$, $Ar^4$ represent the same or different phenyl groups or phenyl groups substituted by organic residual group that do not contain a halogen. Cited as specific examples may be a phenyl group, a tolyl group, a xylyl group, a cumenyl group, a mesityl group, a naphtyl group, an indenyl group, an anthryl group, and the like. Preferred are a phenyl group, a tolyl group, a xylyl group, a cumenyl group and a naphtyl group. Particularly preferred are a phenyl group, a tolyl group and a xylyl group.

Still further, Y represents O, S, $SO_2$, $C(CH_3)_2$, $CH_2$ and CHPh, where Ph represents a phenyl group.

As preferable commercially available products of aromatic phosphates, "PX-200", "PX-201", "CR-733S", "CR-741", "TPP" and the like by Daihachi Kagaku Kogyo (KK), and their equivalents may be cited.

The red phosphorus used in the invention is unstable if not processed, and has such a property that it gradually dissolves in water and gradually reacts with water. Therefore, the red phosphorus is preferably treated so as to prevent the aforementioned phenomena. Cited as a method of treating red phosphorus may be a method as described in JP-A-5-229806 in which red phosphorus is turned into fine particles without pulverizing red phosphorus so that a pulverized surface being highly reactive with water or oxygen is not allowed to form on a red phosphorus surface, a method in which oxidation of red phosphorus is catalytically controlled by adding a small amount of aluminum hydroxide or magnesium hydroxide, a method in which contact of red phosphorus with moisture is controlled by coating red phosphorus with paraffin or a wax, a method in which red phosphorus is stabilized by mixing it with e-caprolactam or trioxane, a method in which red phosphorus is stabilized by coating it with a thermosetting resin of a phenol-type, a melamine-type, an epoxy-type, an unsaturated polyester-type or the like, a method in which red phosphorus is stabilized by treatmg it with an aqueous solution of a metallic salt of copper, nickel, silver, iron, aluminum, titanium or the like, so that a metallic phosphorus compound is precipitated on a red phosphorus surface, a method in which red phosphorus is coated with aluminum hydroxide, magnesium hydroxide, titanium hydroxide, zinc hydroxide or the like, a method in which red phosphorus surface is stabilized thiough electroless plating coating of a red phosphorus surface with iron, cobalt, nickel, manganese, tin or the like, and combined methods of the aforementioned methods. Preferred are the method in which red phosphorus is turned into fine particles without pulverizing red phosphorus so that a pulverized surface is not allowed to form on a red phosphorus surface, the method in which red phosphorus is stabilized by coating it with a thermosetting resin of a phenol-type, a melamine-type, an epoxy-type, an unsaturated polyester-type, thermoplastic resin of a phenol-type or the like, and the method in which red phosphorus is stabilized by coating it with aluminum hydroxide, magnesium hydroxide, titanium hydroxide, zinc hydroxide or the like. Particularly preferred are the method in which red phosphorus is turned into fine particles without allowing a pulverized surface to form on a red phosphorus surface, and the method in which red phosphorus is stabilized by coating it with a thermosetting resin of a phenol-type, a melamine-type, an epoxy-type, an unsaturated polyester-type or the like. Red phosphorus coated with a phenol-type resin or an epoxy-type resin, among the aforementioned thermosetting resins and thermoplastic resins, may be preferably used in view of moisture resistance. Particularly preferred is red phosphorus coated with the phenol-type resin.

The average particle size of red phosphorus is preferably 0.01–35 µm and, more preferably, 0.1–30 µm, in view of flame retardancy, mechanical properties, moisture and heat resistant properties, and control of chemical and physical deteriorations of red phosphorus that may be caused by pulverization for recycled use.

The average particle size of red phosphorus can be measured by an ordinary laser diffraction-type particle size distribution measuring apparatus. There are wet-type and dry-type particle size distribution measuring apparatuses, and either type may be used. In the case of the wet type, water can be used as a dispersion solvent for red phosphorus. In this case, red phosphorus may be surface-treated with an alcohol or a neutral detergent. As a dispersion solvent, a phosphate, such as sodium hexametaphosphate, sodium pyrophosphate or the like, may also be used. As a dispersion apparatus, an ultrasonic bath may also be used.

Although the average particle size of red phosphorus used in the invention is as described above, red phosphorus of great particle sizes contained in the red phosphorus, that is, red phosphorus having a particle size of 75 $\mu$m or greater, remarkably reduces the flame retardancy, mechanical properties, moisture and heat resistance, and recyclability. Therefore, it is preferable to remove red phosphorus having a particle size of 75 $\mu$m or larger by a classification or the like. In view of flame retardancy, mechanical properties, moisture and heat resistance, recyclability, the content of red phosphorus having a particle size of 75 $\mu$m is preferably at most 10 wt. % and, more preferably, at most 8 wt. % and, particularly preferably, at most 5 wt. %. The lower limit of the content is not particularly restricted, but a lower limit closer to zero is more preferable.

The content of red phosphorus of a particle size of 75 $\mu$m contained in the red phosphorus can be measured through classification using a 75—$\mu$m mesh. That is, from the amount of residue Z (g) obtained by the 75—$\mu$m mesh classification of 100 g of red phosphorus, the content of red phosphorus having particles sizes of 75 $\mu$m or greater can be calculated as in Z/100×100(%).

The electric conductivity of the red phosphorus used in the invention occurring during an extraction in hot water (the electrical conductivity is measured by adding 100 ml of pure water to 5 g of red phosphorus, and performing extraction in, for example, an autoclave, at 121° C. for 100 hours and, after filtration of the red phosphorus, diluting the filtrate to 250 ml, and then measuring the electrical conductivity of the diluted extract) is normally 0.1–1000 $\mu$s/cm and, preferably, 0.1–800 $\mu$s/cm and, more preferably, 0.1–500 $\mu$s/cm, in view of the moisture resistance, the mechanical strength, the anti-tracking property and the surface property of a molded article.

The amount of phosphine produced from the red phosphorus used in the invention (the amount of phosphine produced is measured by placing 5 g of red phosphorus in a nitrogen-displaced container, for example, a test tube, which has a capacity of 500 ml, and reducing the pressure to 1.3 kPa (10 mmHg), and then heat-treating it at 280° C. for 10 minutes, and cooling it to 25° C., and diluting the gas in the test tube with nitrogen gas to recover a pressure of $1.0 \times 10^2$ kPa (760 mmHg), and measuring the amount of phosphine through the use of a phosphine (hydrogen phosphide) detector tube. The amount of phosphine produced is determined by the following expression: the amount of phosphine produced (ppm)=detector tube-indicated value (ppm)× dilution factor) is normally at most 100 ppm and, preferably, at most 50 ppm and, more preferably, at most 20 ppm, in view of the amount gas produced from the resultant composition, the stability during an extrusion process and a molding process, the mechanical strength during melt residence, the surface appearance of a molded article, the corrosion of terminals by the molded article, and the like.

As preferable commercially available products of red phosphorus, "Novaexcel 140" and "Novaexcel F5" and the like made by Rinkagaku Kogyo Co., and their equivalents may be cited.

The nitrogen compound used in the invention is not particularly limited as long as it is an organic or inorganic compound containing nitrogen. Cited as representative examples of the nitrogen compound may be nitrogen-containing compounds, such as compounds having a triazine ring, salts formed by ionic bonding of a plurality of the same or difference compounds selected from the aforementioned triazine ring compounds, compounds formed through condensation of a plurality of the same or different compounds selected therefrom, and the like.

Cited as compounds having triazine rings may be, for example, cyanuric acid, 2-methyl-4,6-diamino-triazine, 2,4d-dimethyl-6-amino-triazine, 2-methy-4,6-dihydroxy-triazine, 2,4-dimehtyl-6-hydroxy-triazine, trimethyl triazine, tris(hydroxymethyl)triazine, tris(1-hydroxyethyl)triazine, tris(2-hydroxyethyl)triaznne, isocyanuiic acid, tris (hydroxymethyl)isocyanurate, tris(1-hydroxyethyl) isocyanurate, tris(2-hydroxyethyl)isocyanurate, triallyl isocyanurate, and the like. Besides, melamine and the like are also included in the nitrogen compounds.

The melamine and the like refer to melamine, melamine derivatives, compounds having a similar structure to that of melamine, condensations of melamine, and the like. For example, melamine, ammeride, ammerine, benzoguanamine, acetoguanamine, formoguanamine, guanyl melamine, cyanomelamine, aryl guanamine, melam, melem, melon, succinoguanmine, adipoguanamine, rnethylglutaroguanamine, melamine phosphate, and the like.

Cited as salts of compounds having triazine rings may be, for example, salts having a salt having a composition of 1:1 (in some cases, 1:2) mole ratio, such as a salt of cyanuric acid and melamine, a salt of isocyanuric acid and melamine. With regard to these salts, for example, some of the amtino groups or hydroxyl groups in melamine cyanurate or melamine isocyanurate may be substituted by other substituents. The salt of melamine and cyanuric acid or isocyanuric acid can be obtained by, for example, mixing an aqueous solution of cyanuric acid or isocyanuric acid and an aqueous solution of melamine, and stirring and reacting the mixture at 90–100° C., and filtering, drying and, if necessary, pulverizing the produced precipitate. This salt does not need to be completely pure. If there are some amounts of a triazine-type compound or cyanuric acid or isocyanuric acid remaining, no problem arises.

The nitrogen compound used in the invention is preferably cyanuric acid, isocyanuric acid, melamine, melarine cyanurate, melamine phosphate, and the like. In view of flame retardancy and heat resistance, melamine cyanurate, melamine phosphate is more preferable.

The average particle size of the nitrogen compound is preferably within a range of 0.01–500 $\mu$m and, more preferably, within a range of 1–100 $\mu$m, in view of the flame retardancy, the mechanical properties and the appearance of a molded article.

As preferable commercially available products of melamine cyanurate, "MC-440" by Nissan Chemical Industries, ltd. and its equivalent may be cited.

The silicone compound used in the invention is not particularly limited as long as it is an organic or inorganic compound having a silicone. Silicone reins and silicone rubbers may be cited as representative examples Preferred are polyorganosiloxane resinous polymers and copolymers made up of siloxane units chemically bonded which are selected from units expressed by the following general formulas (1)–(4) and mixtures thereof.

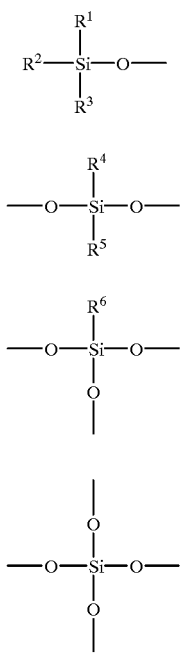

(1)

(2)

(3)

(4)

In the formulas, $R^1$–$R^6$ are phenyl groups or methyl groups independently of each other (where not all of R1–R6 are methyl groups). The silicone resin/of silicone rubber in the invention is polyorgamosiloxane (co)polymer or a mixture thereof. The phenyl group:methyl group proportion thereof is preferably 100–40 mol %:0–60 mol % in mole ratio and, more preferably, 100–50 mol %:0–50 mol % and, particularly preferably, 100–60 mol %:0–40 mol %.

The silicone resin or silicone rubber is produced by a normal production method. The portions of phenyl groups and methyl groups in the silicone resin or silicone rubber are adjusted by the amount of a phenylsilane-type material, such as diphenyldichlorosilane, monophenyltrichlorosilane or the like, and the amount of a methylsilane-type material, such as dimethyldichlorosilane, monomethyltrichlorosilane or the like, which are used during the production of the silicone resin or silicone rubber.

As for the polyorganosiloxane resinous polymer or copolymer, it is possible to use polyorganosiloxane resinous polymers or copolymers having an epoxy group, an acryloxy group, a metbacryloxy group, a vinyl group, a phenyl group, an N-β-(N-vinylbenzylamino)ethyl-γ-aninoalkylhydrochloride group or a hydroxyl group as a reactive functional group in the molecule and at a terminal of the molecule. Among these, the polymers or copolymers having an epoxy group, an acryloxy group or a methary-lopxy group may be preferably used.

Particularly in the case of the silicone rubber, a silicone in the form of powder or powder rubber at room temperature is preferable. In the case of the silicone resin, a silicone resin in the form of powder or flakes is preferable.

The silicone resin or silicone rubber used in the invention exhibits a weight reduction of at most 60% and, more preferably, at most 40%, at 800° C. with respect to room temperature (30° C.) in a heating test that is conducted in air at a temperature increase rate of 40° C./min in a temperature range of 100–900° C. by using a differential thermal calorie-weight simultaneous measurement apparatus (TG/DTA-200 by Seiko Instruments Inc.).

As the silicone resin or silicone rubber used in the invention, a silicone resin or silicone rubber containing a silica filler may be used. Particularly, if a silica filler is added to a silicone rubber, the dispersity of the silicone rubber in the resin composition improves and, due to the multiplier effects of the silica filer and the silicone rubber, the weight reduction at 800° C. decreases and the flame retardancy improves. Furthermore, the reinforcing effect of the silica filler improves the heat resistance. Thus, the addition of a silica filler is preferable. Particularly in the case of a silicone rubber powder, the addition of a silica filler is effective.

As for the method of mixing a silicone rubber and a silica filler, a conventional method may be used. Furthermore, an alkoxysilane coupling agent may be compounded with a composition made up of a silicone rubber and a silica filler.

As such a sliane coupling agent, it is possible to use a silane coupling agent that has in the molecule at least one alkoxy group having a carbon number of 1–4 and, furthermore, an epoxy group, an acryloxy group, a meth-acryloxy group, a vinyl group, a phenyl group, an N-β-(N-vinylbenzylamino)ethyl-γ-aminoalkylhydrochloride or a hydroxyl group. Particularly, a silane coupling agent containing an epoxy group, an acryloxy group or a meth-acryloxy group may be preferably used.

In the invention, a silicone resin and a silicone rubber may be used together. If a silicone resin and a silicone rubber re used together, there is no restriction except that the entire weight reduction at 800° C. be 60%.

The molecular weight (weight-average molecular weight) of the silicone resin or silicone rubber used in the invention is preferably 10,000–300,000 and, more preferably, 40,000–250,000. Measurement of the molecular weight can be performed by a gel permeation chromatography (GPC) as in ordinary macromolecules.

The fluorine compound used in the invention is not particularly limited as long as it is an organic or inorganic compound containing fluorine. Cited as examples of the fluorine compound may be polytetrafluoroethylene, polyhexafluoropropylene, (tetrafluoroethylene/hexafluoropolypropylene) copolymers, (tetrafluoroethylene/perfluoroalkyl vinyl ether) copolymers, (tetrafluoroethylene/ethylene) copolymers, (hexafluoropolypropylene/propylene) copolymers, polyvinylidene fluoride, (vinylidene fluoride/ethylene) copolymers, and the like. Among these, polytetrafluoroethylene, and (tetrafluoroethylene/ethylene) copolymers are preferred.

The metallic hydroxide used in the invention refers to hydroxides containing II-family metals, such as magnesium, potassium, barium, zinc, etc., or III-family metals, such as aluminum, etc. For example, magnesium hydroxide, potassium hydroxide, barium hydroxide, zinc hydroxide, aluminum hydroxide, etc. may be cited. These metallic hydroxides may be used singly or in mixtures.

The metallic hydroxide used in the invention is preferably aluminum hydroxide, which is low-cost and highly effective, and/or magnesium hydroxide, which is excellent in heat resistance.

The magnesium hydroxide used in the invention may be of a natural type or of a synthetic type. Preferred is a synthetic type magnesium hydroxide wherein the distribution range of average crystal grain size is small and the dispersity in the component [C] is excellent. The average crystal grain size of magnesium hydroxide is preferably 0.2–50 μm in view of control of reductions in the mechanical properties. The average crystal grain size of magnesium hydroxide is more preferably 0.5–10 μm and, still more preferably, 0.7–5 μm and, particularly preferably, 1–3 μm. If the average crystal grain size is less than 0.2 μm, there may occur a problem in a production process, such as deterioration of the to-extruder feeding characteristic at the time of compounding with component [C]. If the average crystal grain size exceeds 50 μm, there may occur problems such as poor dispersity in the component [] and poor flame retardancy.

The shape of primary crystal grains of magnesium hydroxide may be a hexagonal platy shape, a needle shape or the like, a mixture thereof. In this case, the aspect ratio of primary crystal grains is preferably at most 200. If the aspect ratio exceeds 200, there normally occurs a reduction in, particularly, impact strength. In order to achieve excellent flowability during a molding process, it is preferable that the shape of primary crystal grains be a hexagonal platy shape and, particularly, a shape close to a spherical shape wherein a c-axis is developed. In this case, the aspect ratio of primary crystal grains is less than 100.

The magnesium hydroxide may be one that has been surface-treated with a known surface treatment agent or not so treated. Cited as the surface treatment agent may be, for example, saturated higher aliphatic acids, such as stearic acid and the like, unsaturated higher aliphatic acids, such as oleic acid and the like, alkali metal salts thereof, coupling agents such as silane coupling agents, aluminate coupling agents, titanate coupling agents, phosphoric acid partial esters of acids or alkali metal salts of mono or di-esters of orthophosphoric acid and stearyl alcohol, high-polarity resins such as an amide type, a urethane type or the like, and the like. For improvement in thermal stability, coating with a theimosetting resin of a phenol-type, a melamine-type, an epoxy-type, an unsaturated polyester-type or the like is also possible. Furthermore, in order to control a surface whitening phenomenon of a molded article and further improve acid resistance and flame retardancy, it is also possible to solid-dissolve a metal element in a surface. Cited as the metal element may be, for example, nickel, zinc, iron, and the like. It is more preferable that surface treatment be performed by a surface treatment agent that does not chemically react with the component [C] during a molding process. If a surface is treated in such a manner that a chemical reaction is caused, the flowability during a molding process becomes poor, and the advantages of the invention cannot be fully achieved. The amount of surface treatment by a surface treatment agent is preferably 0.1–10 parts by weight for 100 parts by weight of magnesium hydroxide.

Cited as preferable commercially available produces of magnesium hydroxide may be "Kisuma 5A", "Kisuma 5 B", "Kisuma 5E, "Kisuma 5J" powder or grain products by Kyowa Chemical Industry co., "Finemag SN-T", "Finemag SN-L", "Echomag Z10" made by TMG, "Magseeds N-0", "Magseeds N-1", "Magseeds N-3", "Magseeds N-10" made by Konoshima Chemical co., "KMH" made by Kinsei Matec co. and the like, and their equivalents.

Other Additives

The thermoplastic resin composition of the invention may further be blended, in accordance with the purpose thereof, with one or more arbitrary additives, such as fillers, electrical conductivity providing materials, flame retardants, (e.g, of a halogen type, a phosphorus type, an organic acid metal salt type (e.g., organic sulfonic acid metal salts, carboxylic acid metal salts, aromatic sulfone imide metal salts, etc.), an inorganic type (e.g., zinc borate, zinc, zinc oxide, zirconium compounds, etc.), a nitrogen type, (guanidine nitride), a fluorine type, a silicone type, etc.), an auxiliary flame retardant (e.g., cadmium oxide, zinc oxide, cuprous oxide, cupric oxide, ferrous oxide, ferric oxide, cobalt oxide, manganese oxide, molybdenum trioxide, tin oxide, titanium oxide, etc.), pigment, dyes, lubricants, mold releasing agents, compatibilizers, dispersing agents, crystal nucleus agents, (e.g., mica, talc, kaolin, etc.), plasticizers (e.g, phosphorous acid esters, etc.), thermal stabilizers, antioxidants, anti-coloring agents, ultraviolet absorbers, flowability reformers, foaming agents, antimicrobial agents, vibration-control agents, deodorants, slidability reformers, electrical conductivity providing agents, antistatic agents, (e.g., polyether ester amide, etc.), and the like.

The filler herein is compounded in order to provide an effect in accordance with the use of the thermoplastic resin composition of the invention, such as, controls of mechanical properties (e.g., tensile strength, modulus, elongation, impact strength, linear expansively, thermal deformation temperature, etc.), thermal properties (e.g., coefficient of thermal expansion, heat conductivity, etc.), molding processing characteristics (e.g., the biting to a screw, viscosity, degree of filling, burrs, sink, surface smoothness, etc.), specific gravity, anisotropy, and the like, reduction of the cost, and the like. As the filler, it is possible to use, for example, mica, talc, kaoline, sericite, bentonite, xonotolite, sepiolite, smectite, monmorillite, wollastonite, silica, calcium carbonate, glass fibers, glass beads, glass flakes, glass micro-balloons, clay, molybdenum disulfide, titanium oxide, zinc oxide, antimony oxide, calcium polyphosphate, graphite, barium sulfate, magnesium sulfate, zinc borate, calcium borate, aluminum borate whisker, potassium titanate whisker, macromolecules, and the like. These fillers may be used singly or in a blend of two or more fillers. As for the shape of the filler, it is possible to select an arbitrary shape or form, such as a particle form (solid, hollow), a powder form, a scale form, a flake form, a balloon form, a whisker form (two-dimensional, three-dimensional), a fiber form, and the like, in accordance with purposes. The filler may be of a natural type or of a synthetic type. The type of filler may be arbitrarily selected in accordance with purposes. In view of balance of dispersity in a resin, mechanical properties, cost, electrical conductivity, etc., glass fiber, wollastonite, monmorillite, titanium oxide are potassium titanate are preferable. Particularly, if a glass fiber is used, the glass fiber may be compounded in the form of a continuous filament (roving), or may be cut after being compounded in the form of a continuous filament (roving), or may be compounded in the form of a discontinuous filament (chopped strand). It is preferable that the glass fiber be compounded in the form of a long-fiber pellet described below.

The electrical conductivity providing material herein refers to a material having electrical conductivity. Cited as examples thereof may be metals (e.g., in a particle form, a flake form, a ribbon form, etc.), metal oxides (e.g., in a particle form, etc.), carbon (e.g., in a powder form, etc.), graphite (e.g., in a scale form, an expanded particle form, a fine powder form, etc.), filler having electrical conductivity, non-conductive fillers surface-coated with electrical conductors, electrically conductive macromolecules, and the like. These materials may be used singly or in combinations of two or more. The electrical conductors for coating the filler refer to materials having electrical conductivity. For example, metals, metal oxides, carbon, etc. may be cited. Preferred among these are metals having highest electrical conductivity. As for such a metal, it is possible to use nickel, titanium, aluminum, chrome, zinc, antimony, copper, silver, gold, etc., singly or in combinations. The metal is preferably deposited on the filler in a single layer or a plurality of layers in accordance with need. The method of coating the filler with an electrical conductor is not particularly limited. The coating is preferably accomplished with a high adhesion strength by an electro or electroless plating method, an ion-plaiting method, a CVD method, a PVD method, a vapor deposition method or the like.

The average particle size of the electrical conductivity providing material used in the invention is preferably within a range of 0.5–500 µm. A more preferable range is 1–100 µm. A still more preferable range is 1.5–50 µm. Particularly preferred is a range of 2–25 µm. If the average particle size is less than 0.5 µm, the dispersity in a molded article tends to become poor, and the flowability during a molding process deteriorates, so that problems, such as a poor thin-wall moldability, result. Thus, such a small average particle size is not preferable. If the average particle size exceeds 500 µm, the electrical conductivity providing effect becomes poor, and a desired electrical conductivity providing effect cannot be achieved. Thus, such a large average particle size is not preferable.

As for the electrical conductivity providing material used in the invention, it is preferable that the material have high electrical conductivity, in order to achieve a high electrical conductivity providing effect. Therefore, the electrical conductivity providing material is preferably selected from metals, metal oxides and graphite.

Cited as the metals may be, for example, nickel, titanium, aluminum, chrome, iron, stainless steel, aluminum, tin, lead, antimony, zinc, cadmium, magnesium, tungsten, lithium, molybdenum, beryllium, cobalt, vanadium, manganese, antimony, copper, brass, silver, gold, platinum, alloys of combinations of two or more of the aforementioned metals, alloys containing at least one the metals as major components, compounds of the metals and phosphorous, etc. These metals and compounds may be used singly or in combinations of two or more. Among these, silver, nickel and titanium are preferred because they achieve high electrical conductivity providing effect.

The metal may be provided in an arbitrary form, such as a particle form, a flake form, a ribbon form, etc. In view of the electrical conductivity providing effect, the metal is preferably in the particle and/or flake form. If the metal is in the particle form, the form may by an arbitrary form, such as the form of a spherical powder, a particle powder, a dendritic powder, a flake powder, a corniculate powder, a spongy powder, an irregular-shape powder, etc. Among these, the dendritic powder, the flake powder and the comiculate powder are preferable because excellent electrical conductivity providing effect and excellent process-cost reducing effect can be achieved.

The graphite can be provided in an arbitrary form, such as a scale form, an expanded particle form, a fine powder form, etc. In view of the electrical conductivity providing effect, the graphite is preferably in a scale form or a fine powder form.

The thermoplastic resin composition of the invention preferably contains the electrical conductivity providing material within a range of 0.01–15 wt. % relative to 100 wt. % of the thermoplastic resin composition. If the electrical conductivity providing material is less than 0.01 wt. %, the desired electrical conductivity providing effect cannot easily be achieved. If the electrical conductivity providing material is more than 15 wt. %, the flowability during a molding process deteriorates, and the thin-wall moldability becomes poor and, moreover, a high cost and a high specific gravity result. Thus, such a high content of the electrical conductivity providing material may not be preferable. A more preferable range is 0.05–10 wt. %. In a still more preferable composition, the range is 0.1–8 wt. %.

The filler and the electrical conductivity providing material may be swollen or turned organic by a swelling agent or organic-turing agent. The swelling agent or organic-turning agent is not particularly limited as long as it swells or turns organic the filler or the like through ion exchange or the like. Cited as specific examples may be ε-caprolactam, 12-aminododecanoic acid, 12-aminolauric acid, alkyl ammonium salts (dimethyldialkyl ammonium, etc.), and the like. In particular, if a filler (preferably, montmorillonite, mica) saponite, hectorite, sepiolite) that is swollen or turned organic is compounded in a polyamide resin, a polypropylene resin, polyacetal resin, a styrene-type resin, an acryl-type resin or the like, the dispersion of the filler in the order of nanometer becomes possible, so that desired properties can be achieved by a reduced compounding amount. Thus, this is a preferable option.

If the filler, the electrical conductivity providing material, the flame retardant and the like are compounded in the thermoplastic resin composition of the invention, it is possible to knead the additives with a resin or the like beforehand by an extruder or the like, or to compound the additives separately from the thermoplastic resin composition by dry blending or application. The additives may also be mixed beforehand at the time of polymerization of a thermoplastic resin.

In the thermoplastic resin composition of the invention, the component [A] and the component [B] are preferably compounded within ranges of 2–50 wt. % and 0.5–20 wt. %, respectively, relative to 100 wt. % of the thermoplastic resin composition. If the component [A] is less than 2 wt. %, the desired electrical conductivity cannot easily be achieved. If the component [A] is more than 50 wt. %, the flowability during a molding process deteriorates, and the thin-wall moldability becomes poor. If the component [B] is less than 0.5 wt. %, the desired electrical conductivity cannot easily be achieved. If the component [B] is more than 20 wt. %, the flowability during a molding process deteriorates, and the thin-wall moldability becomes poor. More preferably, the component [A] is compounded within a range of 7–40 wt. %, and the component [B] is compounded within a range of 1–15 wt. %. In a still more preferable composition, the component [A] is present within a range of 15–30 wt. %, and the component [B] is present within a range of 1.5–10 wt. %.

Next, the component [A] is preferably made up at least of one or both of a component [A1] and a component [A2].

The component [A1] is a carbon fiber having a high strength and a high modulus and a small specific gravity. It is desirable to use a PAN-type carbon fiber that is excellent in balance of the strength and the modulus. The component [A2] is a metal-coated fiber. As a coating metal, nickel, copper, silver, gold, ytterbium or the like may be used. The fiber is coated with a metal in a single layer or, in some cases, a plurality of layers. The coated fiber is not particularly limited. Carbon fibers, glass fibers, organic fibers and the like may be used. Desirable among these is a component [A1] that is well-balanced in strength and modulus at a high level and that has a small specific gravity. The method of coating the fiber with a metal is not particularly limited. Preferably, the coating is performed by an electro or electroless plating method, a CVD method, a PVD method, an ion-plaiting method, a vapor deposition method or the like.

Preferably, the component [A1] and the component [A2] are compounded within a range of 50–100 wt. % and a range of 0–50 wt. %, respectively, relative to 100 wt. % of the component [A]. The component [A1] is superior to the component [A2] in the adhesiveness to resin. Therefore, if the component [A1] is less than 50 wt. %, the mechanical properties (particularly, impact strength) of the thermoplastic resin composition considerably decrease. Since the component [A2] is coated with a metal, the component [A2] have some problems; for example, it is inferior to the component [A1] in the adhesiveness to resin, and the component [A2] has a greater specific gravity, and is more costly. Therefore, if the component [A2] is compounded in the thermoplastic resin composition in an amount greater than 50 wt. %, there occur problems; for example, the mechanical properties (particularly, impact strength) decrease, and the specific gravity increases, and the cost rises. Consequently, it is more desirable that the component [A1] and the component [A2] be compounded within a range of 55–95 wt. % and a range of 5–45 wt. %, respectively. In a particularly desirable composition, the component [A1] is present within a range of 60–90 wt. %, and the component [A2] is present within a range of 10–40 wt. %.

The thermoplastic resin composition of the invention is formed by a known molding method, for example, injection molding (injection-compression molding, gas-assist injection molding, insert molding, etc.), blow molding, rotating molding, extrusion molding, press molding, transfer molding, filament winding molding, etc. A most desirable molding method may be to form the thermoplastic resin composition by the injection molding method that achieves high productivity. The form of a molding material used for the molding may be a pellet, a BMC, an SMC, a stampable sheet, a pre-preg or the like. A most desirable molding material is a pellet that is used for injection molding. The pellet normally refers to pellets obtained by kneading desired amounts of a resin, a fiber and a chopped strand or a continuous filament (tow) in an extruder, and extruding and pelletizing the mixture. In this case, a carbon powder may be kneaded with a fiber by using a master batch of a resin and the carbon powder kneaded beforehand, or may be kneaded with a resin simultaneously with a fiber. The carbon powder may also be kneaded with a fiber sizing agent beforehand. In the aforementioned pellet, the length of fibers in the pellet is shorter than the length of the pellet in the lengthwise direction. However, the pellet in the invention also includes a long-fiber pellet. The long-fiber pellet refers to a pellet wherein fibers are arranged substantially parallel in the lengthwise direction of the pellet and the length of fibers in the pellet equals or exceeds the length of the pellet, as described in U.S. Pat. No. 4,559,262. In this case, the fiber bundle may be impregnated with or coated with a resin. In particular, in the case of a long-fiber pellet coated with a resin, the fiber bundle may be impregnated beforehand with a resin that is as viscous as or less viscous (lower in molecular weight) than that of the coating resin. For example, if the coating resin is a polyamide resin, the fiber bundle may be impregnated with a liquid-crystalline resin, a low molecular-weight polyamide resin, an alcohol-soluble polyamide resin, a water-soluble polyamide resin, an epoxy resin, a phenol-type resin or the like. In the case of the long-fiber pellet, the fiber bundle may be impregnated with or coated with carbon powder, by using a master batch of kneaded carbon powder. The carbon powder may be kneaded beforehand with a fiber sizing agent. The carbon powder may also be mixed in the fiber bundle before the impregnation or coating.

In order to provide a molded article made of a thermoplastic resin composition of the invention with high electrical conductivity and high mechanical properties (in particular, strength and impact strength), it is effective to increase the length of electrically conductive fibers in the molded article. To that end, it is desirable to form a molded article by using a long-fiber pellet among the aforementioned pellets.

In order to simultaneously achieve high electrical conductivity and high mechanical properties (strength and impact strength) in the molded article formed by injection molding using the aforementioned pellet, it is effective to increase the length of electrically conductive fibers in the molded article, as stated above. However, in this case, the effects of the molding conditions and the injection molding apparatus and, furthermore, the molds, must be taken into consideration. With regard to the molding conditions, a lower back pressure, a lower injection rate and a lower screw revolution speed tend to provide an increased length of electrically conductive fibers in the molded resin article. Particularly, it is desirable that the back pressure be set as low as possible within an extent that does not cause unstable measurement characteristic. A desirable back pressure is about 0.1–1 MPa. With regard to the injection molding apparatus, a greater nozzle diameter, a smaller nozzle taper angle, a greater screw groove depth and a lower compression ratio tend to provide a greater length of electrically conductive fibers in the molded resin article. With regard to the molds, increases in sprue diameter, runner diameter and gate size (diameter) tend to increase the length of electrically conductive fibers in the molded resin article.

The molded article of the invention has not only high electrical conductivity and excellent thin-wall moldability but also high flame retardancy (in particular, high drip preventative property) due to addition of the component [B]. Therefore, it is possible to achieve a flame retardancy with a thickness of 1.6 mm ($\frac{1}{16}$ inch) that is V-0 or better in the UL 94 standard (Standard for tests for flammability of plastic materials standardized by Underwriters Laboratories Inc.). Here, V-0 flame retardancy refers to satisfaction of criteria such as flaming time, flame growing, dripping and inflammability of the dripped particles, etc, standardized in the UL 94. The better flame retardancy than V-0 refers to satisfaction of criteria in more short flaming time, or satisfaction of criteria with a thinner test piece.

With regard to formation of a UL 94 test piece in the invention, the test piece is formed by basically orienting electrically conductive fibers in a direction perpendicular to the direction of a longer side of the test piece. Particularly, if a test pieces is formed by injection molding, the test pieces is formed by using a mold that is filled through a film gate that extends over the entire length of the longer side of the test piece.

To provide a molded article of the invention with a higher flame retardancy, it is effective to use the component [D] as a flame retardancy as well. If flame retardancy with a thickness of 0.8 mm ($\frac{1}{32}$ inch) is to be provided to a level that is V-0 or better, use of red phosphorus as a component [D] often achieves a high flame retardancy as mentioned above.

If the volume resistivity of the molded article exceeds 2.5 $\Omega \cdot cm$, the molded article is not readily applied to uses as an electromagnetic wave shield or the like, and thus the use thereof is limited.

The molded article made of the thermoplastic resin composition of the invention preferably has a volume resistivity of, desirably, at most 2.5 0 $\Omega \cdot cm$ and, preferably, at most 1.5 $\Omega \cdot cm$ and, more preferably, at most 1 $\Omega \cdot cm$ and, further more preferably, at most 0.6 $\Omega \cdot cm$.

In order to satisfy the electrical conductivity requirement and the appearance requirement of the molded article, it is preferable to control the amount of the component [A] added in the thermoplastic resin composition at a low level. However, in such a case, the electrical conductivity decreases. However, the component [B] achieves a high electrical conductivity and the reduction in the thin-wall moldability is minimized. Therefore, the advantage of the invention is apparent.

The volume resistivity is measured with respect to a molded article made of a resin composition. The volume resistivity herein is calculated by obtaining a resistance value by subtracting contact resistance values of a measuring device and jigs and the like from an electrical resistance value across conductive paste-applied opposite end portions of a test piece having a rectangular shape, and multiplying the obtained resistance value by the area of the end portions of the test piece and dividing it by the length of the test piece. In the invention, the unit thereof is $\Omega \cdot cm$.

The molded article of the invention has not only high electrical conductivity but also high flexural modulus due to the components [A] and [B]. Therefore, it is optimal to use the molded article of the invention as a molded article having a flexural modulus within a range of 6–40 GPa with a plate thickness of 6.4 mm (¼ inch) in ASTM D 790 standard (inter-span distance L/plate thickness D=16). A more preferable range is 8–30 GPa. A particularly preferable range is 10–25 GPa. The use as a molded article having such a flexural modulus fully realizes the advantages of the invention.

The molded article of the invention has not only high electrical conductivity but also high impact strength due to the components [A], [B] and [C]. Therefore, it is optimal to use the molded article of the invention as a molded article having an mold notchrd Izod impact strength within a range of 60–250 J/m with a thickness of 3.2 mm (⅛ inch) in ASTM D 256 standard. A more preferable range is 70–200 J/m. A particularly preferable range is 80–180 J/m. The use as a molded article having such an impact strength fully realizes the advantages of the invention.

Furthermore, since the molded article of the invention has high electrical conductivity and high mechanical properties (strength, flexural modulus, impact strength, etc.), the molded article allows a further reduction of the wall thickness than the conventional molded articles. The molded article of the invention is most suitably used as a thin-wall molded article having a wall thickness of, preferably, at most 4 mm and, more preferably, at most 3 mm and, particularly preferably, at most 2 mm. The wall thickness of a molded article herein refers to a wall thickness of a flat plate portion of the molded article excluding protruded portions such as rib portions, boss portions and the like.

The molded article of the invention has high electrical conductivity and excellent thin-wall moldability and, furthermore, high mechanical properties (strength, flexural modulus, impact strength, etc.). Therefore, the molded article is suitably used for housings or casings of an electronic or electrical appliance, an office automation appliance, a domestic electronic appliance, or a use in an automotive field, or component parts that require such properties and, in particular, housings or casings of portable electronic and electrical appliances and the like that require high levels of weight reductions. More specifically, the molded article is suitably used for housings or casings of large-size displays, notebook-size personal computers, portable telephones, PHS, PDA (portable information terminals such as electronic pocketbooks and the like), video cameras, digital still cameras, portable radio-cassette players and the like.

EXAMPLES

The invention will be described in detail with reference to examples. The below-described examples do not limit the invention, but the modification and working without departing from the gist described above and below is included within the technical scope of the invention.

Items of evaluation and the method thereof regarding the moldability of resultant molding materials will be described below.

(a) Injection Pressure

The thin-wall moldability was represented by the injection pressure occurring during injection molding of a thin-wall flat plate of 150 mm in width×150 mm in length×1 mm in thickness through a fan gate (unit is MPa). It can be said that the lower the injection pressure, the more excellent the thin-wall moldability (the flowability during the injection molding process). The injection molding was performed by using an injection molding apparatus J150EII-P (by The Japan Steel Works, ltd., the mold clamping force being 1450 kN (150 t)).

The items of evaluation and the methods thereof regarding resultant molded articles will be described below.

(b) Volume Resistivity

Test pieces of 12.7 mm in width×65 mm in length×2 mm in thickness injection-molded through a fan gate were subjected to measurement in an absolute dry condition (the moisture percentage being at most 0.1%). First, an electrically conductive paste (Dotite by Fujikura Kasei (KK)) was applied to width×thickness surfaces of a test piece. After the electrically conductive paste was sufficiently dried, the surfaces were presscontacted with electrodes to measure value of electric resistance between the electrodes by a digital multi-meter (made by FLUKE). A volume resistivity value ($\Omega \cdot cm$) was determined by multiplying a value obtained by subtracting the contact resistances of the measuring device and jigs and the like from the measured electric resistance value, by the area of the electrically conductive paste-applied surfaces, and then dividing it by the length of the test piece.

(c) Flame Retardancy

Evaluation was made by a flame retardancy test according to the UL 94 standard. The plate thicknesses of test pieces used were a thickness of 1.6 mm (¹⁄₁₆ inch) and a thickness of 0.8 mm (¹⁄₃₂ inch).

(d) Flexural Modulus

Evaluation was made by flexural modulus according to ASTM D 790 (inter-span distance L/thickness D=16) (unit being GPa). The plate thickness of the test pieces used was a thickness of 6.4 mm (¼ inch). The test pieces were subjected to the test, with the moisture percentage being at most 0.1%.

(e) Impact Strength

Evaluation was made by Izon impact strength with a mold notch according to ASTM D 256 (unit being J/m). The plate thickness of the test pieces used was a thickness of 3.2 mm (⅛ inch). The test pieces were subjected to the test, with the moisture percentage being at most 0.1%.

(f) Appearance

With respect to the thin-wall flat plates molded as described above, the surface gloss, the float and dispersion of electrically conductive fibers and the color irregularity defect were relatively evaluated. ⊙ (none of the aforementioned defects), ○ (any one of the defects), Δ (two of the defects), X (all of the defects).

Examples 1, 2, Comparative Examples 1, 2

Desired amounts of components [B] and [D], other components and a component [C] were sufficiently melted and kneaded and extruded by a double-screw extruder (the barrel temperature being 250° C.) to prepare master pellets in which the components [B] and [D] were homogenized in the component [C].

Next, the master pellets dry-blended at a desired proportion were put in via a main hopper of a double-screw extruder (the barrel temperature being 250° C.). While the well-kneaded melt was being extruded, the component [A] processed into chopped strands by using a sizing agent was put in via a side hopper so as to impregnate the component [A] chopped strands with various components including at least the component [C]. The resultant extruded resin-gut containing discontinuous component [A] was cooled, and then was cut into 5 mm by a cutter, thereby obtaining ordinary pellets.

The kinds and compounding proportions of the components are shown in Tables 1 and 2. After the pellets were dried in a vacuum at 80° C. for at least 5 hours, injection molding was performed at a cylinder temperature of 270° C. and a mold temperature of 80° C. The molded articles were subjected to the tests described in (a)–(e). Evaluation results are shown in Tables 1 and 2.

Examples 3–10, Comparative Examples 3–7

Desired amounts of components [B] and [D], other components and a component [C] were extruded by a double-screw extruder (the barrel temperature being 250° C.) to prepare master pellets in which the components [B] and [D] were homogenized in the component [C].

Next, while the master pellets dry-blended at a desired proportion were extruded in a well melted and kneaded state by a single-screw extruder (the barrel temperature being 250° C.) into a crosshead die attached to a distal end of the extruder, the contimuous component [A] tow was sequentially supplied into the crosshead die to sufficiently impregnate the component [A] tow with various components including at least the component [C]. The crosshead die is a device for impregnating the component [A] tow with molten resin and the like while opening the fibers of the component [A] tow in the die. The resultant strand containing continuous component [A] tow was cooled, and then was cut into 7 mm by a cutter, thereby obtaining long-fiber pellets.

The kinds and compounding proportions of the components are shown in Tables 1 to 4. After the pellets were dried in a vacuum at 8° C. for at least 5 hours, injection molding was performed at a cylinder temperature of 280° C. and a mold temperature of 80° C. The injection molding was accomplished according to the tests described in (a)–(e). Evaluation results are shown in Tables 1 to 4.

Examples 11–14

First, desired amounts of components [C] were extruded by a double-screw extruder (the barrel temperature being 250° C. in Examples 11 and 12, and 280° C. in Example 13) to prepare blended resin pellets in which the plural components [C] were homogenized.

Next, components [B] and [D], other components and the blended resin pellets or the component [C] were extruded by a double-screw extruder (the barrel temperature being 250° C. in Examples 11, 12 and 14, and 280° C. in Example 13) to prepare master pellets in which the components [B] and [D] were homogenized in the component [C].

After that, while the master pellets dry-blended at a desired proportion were extruded in a well melted and kneaded state by a single-screw extruder (the barrel temperature being 250° C. in Examples 11, 12 and 14, and 290° C. in Example 13) into the crosshead die attached to a distal end of the extruder, the continuous component [A] tow was sequentially supplied into the crosshead die to sufficiently impregnate the component [A] tow with various components including at least the component [C]. The resultant strand containing continuous component [A] tow was cooled, and then was cut into 7 mm by a cutter, thereby obtaining long-fiber pellets.

The kinds and compounding proportions of the components are shown in Table 4. After the pellets were dried in a vacuum at 80° C. for at least 5 hours, injection molding was performed at a cylinder temperature of 280° C. in Examples 11, 12 and 14, and 320° C. in Example 13, and a mold temperature of 80° C. in each example. The injection molding was accomplished according to the tests described in (a)–(e). Evaluation results are shown in Table 4.

TABLE 1

Effects of Components [A], [B], [D]

| | | | Example | | | | | |
|---|---|---|---|---|---|---|---|---|
| | | | 1 | 2 | 3 | 4 | 5 | 6 |
| Composition (wt. %) | Component [A] | CF1 | 30.0 | — | — | — | — | — |
| | | CF2 | — | 20.0 | — | — | — | — |
| | | CF3 | — | — | 20.0 | 15.0 | 24.0 | — |
| | | NiCF | — | — | — | — | 10.0 | 18.0 |
| | Component [B] CB1; $I_2/I_1$ = 0.68, $I_2/I_3$ = 0.60 | | 5.0 | 3.0 | 5.0 | 5.0 | 4.0 | 5.0 |
| | Component [C] | N6 | 45.2 | — | 52.3 | 55.3 | 43.2 | 53.7 |
| | | PC/ABS | — | 60.0 | — | — | — | — |
| | Component [D] | Br-PPE | 14.2 | — | 16.4 | 17.9 | 13.6 | 16.8 |
| | | Br-Ep | — | 13.7 | — | — | — | — |
| | | SbO | 5.5 | 3.2 | 6.3 | 6.8 | 5.2 | 6.5 |
| | | PTFE | 0.1 | 0.1 | — | — | — | — |
| Moldability (a) Injection pressure (MPa) | | | 12.3 | 14.0 | 12.9 | 11.8 | 13.9 | 9.8 |
| Properties of molded article | (a) Volume resistivity (Ω · cm) | | 0.25 | 0.22 | 0.17 | 0.34 | 0.06 | 0.02 |
| | (b) Flame retardancy | 1.6 mm | V-0 | V-0 | V-0 | V-0 | V-0 | V-0 |
| | | 0.8 mm | V-0 | V-0 | V-0 | V-0 | V-0 | V-0 |

TABLE 1-continued

Effects of Components [A], [B], [D]

|  | Example | | | | | |
|---|---|---|---|---|---|---|
|  | 1 | 2 | 3 | 4 | 5 | 6 |
| (c) Flexural modulus (GPa) | 20.9 | 13.3 | 14.3 | 12.1 | 18.5 | 10.6 |
| (d) Impact strength (J/m) | 85 | 48 | 134 | 117 | 172 | — |
| (e) Appearance | ○ | ⊚ | ○ | ○ | ○ | ○ |

TABLE 2

Effects of Components [A], [B], [D]

|  |  |  | Example 7 | Comparative Example | | | |
|---|---|---|---|---|---|---|---|
|  |  |  |  | 1 | 2 | 3 | 4 |
| Composition (wt. %) | Component [A] | CF1 | — | 30.0 | 20.0 | — | — |
|  |  | CF3 | — | — | — | 20.0 | 20.0 |
|  |  | MF | 16.0 | — | — | — | — |
|  | Component [B] CB1; I₂/I₁ = 0.68, I₂/I₃ = 0.60, Δv₃/2 = 49/cm, Δ(I₃−I₁) = 229/cm |  | 4.0 | — | — | — | — |
|  | Component [C] | N6 | 55.8 | 70.0 | — | 80.0 | 68.0 |
|  |  | PC/ABS | — | — | 80.0 | — | — |
|  | Component [D] | Br-PPE | 17.5 | — | — | — | — |
|  |  | SbO | 6.7 | — | — | — | — |
|  |  | RP | — | — | — | — | 6.0 |
| Moldability (a) Injection pressure (MPa) |  |  | 7.5 | 10.8 | 13.4 | 12.9 | 12.0 |
| Properties of molded article | (a) Volume resistivity (Ω · cm) |  | 0.05 | 2.07 | 19.5 | 0.62 | 0.60 |
|  | (b) Flame retardancy | 1.6 mm | V-0 | HB | HB | HB | V-2 |
|  |  | 0.8 mm | V-0 | HB | HB | HB | V-2 |
|  | (c) Flexural modulus (GPa) |  | — | 20.4 | 12.3 | 14.1 | 14.9 |
|  | (e) Appearance |  | ○ | Δ | ○ | Δ | Δ |

TABLE 3

Effects of Component [B]

|  |  |  |  |  |  |  | Example | | Comparative Example | | |
|---|---|---|---|---|---|---|---|---|---|---|---|
|  |  |  |  |  |  |  | 8 | 9 | 5 | 6 | 7 |
| Composition (wt. %) | Component [A] | CF3 |  |  |  |  | 20.0 | 20.0 | 20.0 | 20.0 | 20.0 |
|  | Component [B] |  | I₂/I₁ | I₂/I₃ | Δv₃/2 | Δ(I₃−I₁) |  |  |  |  |  |
|  |  | CB1 | 0.68 | 0.60 | 49/cm | 229/cm | 5.0 | — | — | — | — |
|  |  | CB2 | 0.69 | 0.60 | 54/cm | 226/cm | — | 5.0 | — | — | — |
|  |  | CB3 | 0.15 | 0.14 | 40/cm | 229/cm | — | — | 5.0 | — | — |
|  |  | CB4 | 0.55 | 0.53 | 44/cm | 244/cm | — | — | — | 5.0 | — |
|  |  | CB5 | 0.35 | 0.39 | 43/cm | 245/cm | — | — | — | — | 5.0 |
|  | Component [C] | N6 |  |  |  |  | 63.0 | 63.0 | 63.0 | 63.0 | 63.0 |
|  | Component [D] |  |  | RP |  |  | 6.0 | 6.0 | 6.0 | 6.0 | 6.0 |
|  |  |  |  | MG |  |  | 6.0 | 6.0 | 6.0 | 6.0 | 6.0 |
| Moldability (a) Injection pressure (MPa) |  |  |  |  |  |  | 12.6 | 13.5 | 14.6 | Unmoldable | Unmoldable |
| Properties of molded article | (a) Volume resistivity (Ω · cm) |  |  |  |  |  | 0.1 | 0.17 | 0.26 | 0.17 | 0.18 |
|  | (b) Flame retardancy | 1.6 mm |  |  |  |  | V-0 | V-0 | V-0 | V-0 | V-0 |
|  |  | 0.8 mm |  |  |  |  | V-0 | V-0 | V-0 | Unmoldable | Unmoldable |
|  | (c) Flexural modulus (GPa) |  |  |  |  |  | 15.9 | 15.8 | 15.6 | 15.6 | 15.5 |
|  | (d) Impact strength (J/m) |  |  |  |  |  | 92 | 83 | 74 | 73 | 70 |
|  | (e) Appearance |  |  |  |  |  | ○ | ○ | X | — | — |

TABLE 4

Effects of Components [C], [D]

| | | | Example | | | | |
|---|---|---|---|---|---|---|---|
| | | | 10 | 11 | 12 | 13 | 14 |
| Composition (wt. %) | Component [A] | CF1 | — | — | — | 20.0 | 20.0 |
| | | CF3 | 20.0 | 20.0 | 20.0 | — | — |
| | Component [B] CB1; $I_2/I_1$ = 0.68, $I_2/I_3$ = 0.60 | | 5.0 | 5.0 | 5.0 | 3.0 | 3.0 |
| | Component [C] | N6 | 61.0 | 53.0 | 61.0 | — | — |
| | | ABS | — | 8.0 | — | — | — |
| | | PC | — | — | — | 60.9 | — |
| | | LCP | — | — | 2.0 | 10.0 | — |
| | | PC/ABS | — | — | — | — | 66.9 |
| | | Ph | — | — | — | — | 4.0 |
| | Component [D] | RP | 7.0 | 7.0 | 6.0 | 6.0 | 6.0 |
| | | PTFE | — | — | — | 0.1 | 0.1 |
| | | MG | — | 7.0 | 6.0 | — | — |
| | | MC | 7.0 | — | — | — | — |
| Moldability | (a) Injection pressure (MPa) | | 13.1 | 13.6 | 9.7 | 12.9 | 13.8 |
| Properties of molded article | (a) Volume resistivity (Ω · cm) | | 0.17 | 0.20 | 0.11 | 0.47 | 0.55 |
| | (b) Flame retardancy | 1.6 mm | V-0 | V-0 | V-0 | V-0 | V-0 |
| | | 0.8 mm | V-0 | V-0 | V-0 | V-0 | V-0 |
| | (c) Flexural modulus (GPa) | | 14.4 | 13.2 | 15.4 | 13.9 | 13.1 |
| | (d) Impact strength (J/m) | | 86 | 76 | 79 | 88 | 57 |
| | (e) Appearance | | ○ | ◎ | ◎ | ◎ | ◎ |

The notations provided in conjunction with the components in Tables 1 to 4 are as described below.

Component [A]

CF1: carbon fiber [PAN type, average filament diameter=8 μm, tensile breaking elongation=1.3%, Lc=1.9 nm, surface functional group (O/C)=0.07, specific gravity=1.80]

CF2: carbon fiber [PAN type, average filament diameter=5 μm, tensile breaking elongation=1.9%, Lc=1.9 nm, surface functional group (O/C)=0.07, specific gravity=1.81]

CF3: carbon fiber [PAN type, average filament diameter=7 μm, tensile breaking elongation=2.1%, Lc=1.8 nm, surface functional group (O/C)=0.07, specific gravity=1.80]

NiCF: nickel-coated carbon fiber [INCOFIBER by INCO. SPP, average filament diameter=7 μm, specific gravity=2.1]

MF: stainless steel fiber [Naslon by Nippon Seisen (KK), average filament diameter=8 μm, specific gravity=7.9]

Component [B]

CB1: carbon powder [$I_2/I_1$=0.68, $I_2/I_3$=0.60, $\Delta v_3/2$=49 cm$^{-1}$, $\Delta(I_3-I_1)$=229 cm$^{-1}$]

CB2: carbon powder [$I_2/I_1$=0.69, $I_2/I_3$=0.60, $\Delta v_3/2$=54 cm$^{-1}$, $\Delta(I_3-I_1)$=226 cm$^{-1}$]

Cr3: carbon powder [$I_2/I_1$=0.15, $I_2/I_3$=0.14, $\Delta v_3/2$=40 cm$^{-1}$, $\Delta(I_3-I_1)$=229 cm$^{-1}$]

CB4: carbon powder [$I_2/I_1$=0.55, $I_2/I_3$=0.53, $\Delta v_3/2$=44 cm$^{-1}$, $\Delta(I_3-I_1)$=244 cm$^{-1}$]

CB5: carbon powder [$I_2/I_1$=0.35, $I_2/I_3$=0.39, $\Delta v_3/2$=43 cm$^{-1}$, $\Delta(I_3-I_1)$=245 cm$^{-1}$]

Component [C]

N6: nylon 6 resin ["Amilan" CM1001 by Toray Industries Inc.]

PC: polycarbonate resin ["Lexan" 121R by GE Plastics]

ABS: acrylonitrile-styrene-butadiene copolymer resin ["Toyolac" 100 by Toray Industries Inc.]

PC/ABS: flame retardant blended resin of polycarbonate resin, ABS resin and phosphorus compound ["Bayblend" FR2000 by Bayer]

LCP: liquid-crystal polyester resin ["Siveras" L201E by Toray Industries Inc.]

Ph: phenolic novolac resin [PR-50731 by Sumitomo Durez (KK)]

Component [D]

Br-PPO: brominated polyphenylene oxide [PO-64P by GreatLakes]

Br-Ep: brominated bisphenol-type epoxy [EP-100 by Dainippon Ink Kagaku Kogyo (KK)]

SbO: antimony trioxide [ATOX-S by Nippon Seiko (KK)]

RP: red phosphorus ["Novaexcel 140" by Rinkagaku Kogyo co., average particle size=30 μm, coated with phenol-type thermosetting resin, electric conductivity= 180–200 μS/cm]

MC: melamine cyanurate [MC-440 by Nissan Chemical co.]

PTFE: polytetrafluoroethylene ["Polyflon" F201 by Daikin Kogyo]

MG: magnesium hydroxide ["Kisuma 5EU" by Kyowa Chemical Industry co., synthetic type, average crystal grain size=1 μm, coated with amide-type high-polarity resin, grain form]

Results shown in Tables 1 to 4 indicate as follows.

1. Effects of Component [B]

1-1. In the Case of Compounding

In comparison with Comparative Examples 1, 2 (Comparative Examples 3, 4), wherein no carbon powder was compounded, Examples 1, 2 (Examples 3, 4), wherein the carbon powder in the invention was compounded, significantly reduced the volume resistivity, so that molded articles having greatly improved electrical conductivity can be provided. The examples also achieved substantially the same level of flexural modulus as the comparative examples. Thus, the advantage of the examples is apparent.

Example 4 achieved a reduced volume resistivity value, even in comparison with Comparative Example 3, which is supposed to contain the same total amount (20 wt. %) of carbon expressed by the sum of the compounding proportions of the carbon fiber and the carbon powder as that of Example 4. Thus, the great advantage of the example should be understood.

Due to the compounding of the component [B], Examples 1, 2 (3, 4) minimizes the amount of the component [A], which is much more expensive than the component [B]. Therefore, in comparison with Comparative Examples 1, 2 (3, 4), Examples 1, 2 (3, 4) have great advantages in the cost of materials where the intended electrical conductivities are equal, as well as the superiority in appearance.

1-2. Effects of Kinds

In comparison with Comparative Examples 5 to 7 containing carbon powders outside the scope of the invention, Examples 8, 9 containing carbon powders within the scope of the invention achieved reduced volume resistivity, so that molded articles having excellent electrical conductivity can be provided. With regard to the injection pressure, Examples 8, 9 also achieved lower injection pressures than Comparative Example 5. Example 8, 9 are also superior in thin-wall moldability. With regard to the appearance defect, Examples 8, 9 produced fewer defects and achieved better appearance than Comparative Example 5.

Comparative Examples 6, 7 reduced the volume resistivity substantially to as low a level as Examples 8, 9, so that molded articles having excellent electrical conductivity can be provided. However, with regard to the thin-wall flat plates described in (a) Moldability, even the filling could not be performed in Comparative Examples 6, 7. Thus, Comparative Example 6, 7 were remarkably inferior in thin-wall moldability.

2. Effects of Component [C]

Table 4 clearly shows that high electrical conductivity and high flame retardancy can be maintained even if various kinds of thermoplastic resins are used.

3. Effects of Component [D]

3-1. Halogen Type

In comparison with Comparative Examples 1 to 3 containing neither a component [B] nor a component [D], Examples 8, 9 containing components [B] and [D] exhibited very high flame retardancy, that is, V-0 with a thickness of 0.8 mm (1/32 inch) in the UL 94 standard even though the compounding proportion of the component [A] was as low as 20 wt. %.

3-2. Non-halogen Type

In comparison with Comparative Example 4 containing a component [D] but not containing a component [B], Examples 8, 9 containing both a component [B] and a component [D] exhibited very high flame retardancy, that is, V-0 with a thickness of 0.8 mm (1/32 inch) in the UL 94 standard even though the compounding proportion of the component [A] was as low as 20 wt. %.

4. Effects of Long-fiber Pellets

In comparison with Example 1, in which ordinary pellets were used, Example 3, in which long-fiber pellets were used, achieved a reduced specific resistance even though the compounding proportion of the component [A] was low. Thus, Example 3 can provide molded article having excellent electrical conductivity.

This is because the length of the component [A] in a molded article can be made longer in Example 3 than in Example 1. That is, the weight-average fiber length in molded articles of Example 3 was 0.533 mm (the component [A] wherein the weight-average fiber length was at least 1 mm was present in an amount of at least 5 wt. %), whereas in Example 1, the weight-average fiber length of the resultant molded article was 0.224 mm (the component [A] wherein the weight-average fiber length was at least 1 mm was present in an amount less than 5 wt. %). A method of calculating a weight-average fiber length is described in detail in "An introduction to composite materials" by Derek Hull, p. 71, CAMBRIDGE UNIVERSITY PERSS.

From the above comparisons, the importance of the length of the component [A] in a molded resin article that affects electrical conductivity is apparent. The electrically conductive resin component used in the invention is preferably provided in the form of long-fiber pellets.

INDUSTRIAL APPLICABILITY

According to the invention, it is possible to provide a thermoplastic resin composition that has a low specific gravity, a high electrical conductivity, high mechanical properties (strength, flexural modulus, impact strength, etc.), an excellent thin-wall moldability (flowability during a molding process), a good appearance and a high flame retardancy, and to provide a molding material and a molded article thereof.

The thermoplastic resin molded articles are suitable to a wide range of fields of industry where the aforementioned properties are needed, in particular, housings or casings of electronic and electrical appliances, an office automation appliance, a domestic electric appliance or a use in an automotive field, or a component part and the like.

What is claimed is:

1. A thermoplastic resin composition which is capable of providing a molded article whose flame retardancy at a thickness of 1.6 mm (1/16 inch) in accordance with the UL 94 standard is V-0 or better and which comprises a component [A], a component [B] and a component [C] mentioned below, wherein the component [B] satisfies the following conditions (B1) and (B2):

[A]: an electrically conductive fiber;
[B]: a carbon powder;
[C]: a thermoplastic resin;
(B1): Raman scattering intensity ratio $I_2/I_1$ is 0.65–0.8; and
(B2): Raman scattering intensity $I_2/I_3$ is 0.54–0.8;
where
$I_1$: local maximum value of Raman scattering intensity appearing near a Raman shift of 1360 cm$^{-1}$;
$I_2$: local maximum value of Raman scattering intensity appearing near a Raman shift of 1480 cm$^{-1}$; and
$I_3$: local maximum value of Raman scattering intensity appearing near a Raman shift of 1600 cm$^{-1}$.

2. A thermoplastic resin composition according to claim 1, wherein the component [B] further satisfies following conditions (B3) and/or (B4):

(B3): $\Delta v_3/2$ is 46–59 cm$^{-1}$
(B4): $\Delta(I_3-I_1)$ is 210–240 cm$^{-1}$
where
$\Delta v_3/2$: width only on a high-frequency side of a half of $I_3$
$\Delta(I_3-I_1)$: Raman shift width between I3 and $I_1$.

3. A thermoplastic resin composition according to claim 2, wherein the component [B] satisfies both of conditions (B3) and (B4).

4. A thermoplastic resin composition according to claim 1, wherein the component [B] satisfies all of conditions (B1), (B2), (B3) and (B4).

5. A thermoplastic resin composition according to claim 1, wherein the Raman scattering intensity ratio $I_2/I_3$ is 0.67–0.73.

6. A thermoplastic resin composition according to claim 1, wherein the Raman scattering intensity ratio $I_2/I_3$ is 0.59–0.65.

7. A thermoplastic resin composition according to claim 2, wherein the $\Delta v_3/2$ is 50–55 cm$^{-1}$.

8. A thermoplastic resin composition according to claim 2, wherein the $\Delta(I_3-I_1)$ is 217–231 cm$^{-1}$.

9. A thermoplastic resin composition according to claim 1, which is capable of providing a molded article whose volume resistivity is 2.5 Ω·cm or lower.

10. A thermoplastic resin composition according to claim 1, wherein the component [A] and the component [B] are contained within following ranges in 100 wt. % of the thermoplastic resin composition:

[A]: 2–50 wt. %; and
[B]: 0.5–20 wt. %.

11. A thermoplastic resin composition according to claim 1, wherein the component [A] and the component [B] are contained within following ranges in 100 wt. % of the thermoplastic resin composition:

[A]: 15–30 wt. %; and
[B]: 1.5–10 wt. %.

12. A thermoplastic resin composition according to claim 1, wherein the component [A] is selected from a group consisting of carbon fibers, graphite fibers, and metal-coated fibers.

13. A thermoplastic resin composition according to claim 1, wherein the component [B] is a carbon black.

14. A thermoplastic resin composition according to claim 1, wherein the component [C] is selected from a group consisting of styrene-type resins, polycarbonate resins, polyphenylene ether resins, polyamide resins, polyester resins, polyphenylene sulfide resins, polyolefin resins, liquid-crystalline resins and phenol-type resins.

15. A thermoplastic resin composition according to claims 1, wherein the composition further comprises a flame retardant as a component [D].

16. A thermoplastic resin composition according to claim 15, wherein the component [D] is selected from the group consisting of halogen compounds and antimony compounds.

17. A thermoplastic resin composition according to claim 15, wherein the component [D] is selected from the group consisting of phosphorus compounds, nitrogen compounds, silicone compounds, fluorine compounds, and metal hydroxides.

18. A thermoplastic resin composition according to claim 1, wherein the thermoplastic resin composition is in a form of a pellet.

19. A thermoplastic resin composition according to claim 18, wherein the pellet is a long-fiber pellet.

20. A molded article molded by using a thermoplastic resin composition as described in claim 1.

21. A molded article according to claim 20, wherein the molding method is an injection molding.

22. A molded article according to claim 20, wherein the flame retardancy thereof with a thickness of 0.8 mm (1/32 inch) in accordance with an UL 94 standard is V-0 or better.

23. A molded article according to claim 20, wherein the volume resistivity thereof is 1 Ω·cm or lower.

24. A molded article according to claim 20, wherein the specific gravity thereof is 1 to 1.5.

25. A molded article according to claim 20, wherein the flexural modulus thereof with a thickness of 6.4 mm (1/4 inch) in accordance with an ASTM D 790 is 6 to 40 GPa.

26. A molded article according to claim 20, wherein the molded article has a thickness of 4 mm or thinner.

27. A molded article according to claim 20, wherein the molded article is a housing or a casing of an electrical or electronic appliance, an office automation appliance, a domestic electric appliance or a use in an automotive field, or a component part thereof.

* * * * *